United States Patent
Jang et al.

(10) Patent No.: US 9,720,497 B2
(45) Date of Patent: Aug. 1, 2017

(54) METHOD AND APPARATUS FOR CONTROLLING RENDERING QUALITY

(71) Applicant: Samsung Electronics Co., Ltd., Suwon-si (KR)

(72) Inventors: Choonki Jang, Anyang-si (KR); Haewoo Park, Seoul (KR); Yoonseo Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 46 days.

(21) Appl. No.: 14/667,458

(22) Filed: Mar. 24, 2015

(65) Prior Publication Data

US 2016/0071304 A1    Mar. 10, 2016

(30) Foreign Application Priority Data

Sep. 5, 2014   (KR) .................. 10-2014-0119370

(51) Int. Cl.
*G06T 15/00* (2011.01)
*G06F 3/01* (2006.01)
*G06T 15/20* (2011.01)

(52) U.S. Cl.
CPC .............. *G06F 3/013* (2013.01); *G06T 15/20* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 7,719,540 B2 | 5/2010 | Piazza et al. | |
| 7,834,880 B2 | 11/2010 | Bakalash et al. | |
| 8,111,264 B2 | 2/2012 | Witzel et al. | |
| 8,358,321 B1 | 1/2013 | Weidner | |
| 8,429,564 B2 | 4/2013 | Alexanderovitc et al. | |
| 8,605,087 B2 | 12/2013 | Everitt et al. | |
| 8,913,004 B1* | 12/2014 | Bozarth | G06K 9/00604 345/156 |
| 2005/0286125 A1 | 12/2005 | Sundstrom et al. | |
| 2006/0256133 A1* | 11/2006 | Rosenberg | G06Q 30/02 345/619 |
| 2008/0055311 A1 | 3/2008 | Aleksic et al. | |
| 2008/0077858 A1* | 3/2008 | Asakawa | G06F 17/212 715/255 |
| 2010/0002072 A1* | 1/2010 | Nagai | H04N 5/57 348/36 |
| 2010/0296802 A1 | 11/2010 | Davies | |

(Continued)

FOREIGN PATENT DOCUMENTS

| | | |
|---|---|---|
| KR | 10-0535966 B1 | 12/2005 |
| KR | 10-2011-0001400 A | 1/2011 |
| KR | 10-2011-0125261 A | 11/2011 |

OTHER PUBLICATIONS

US 8,368,703, 02/2013, Blinzer et al. (withdrawn)

*Primary Examiner* — Kyle Zhai
(74) *Attorney, Agent, or Firm* — Harness, Dickey & Pierce, P.L.C.

(57) ABSTRACT

A rendering method, an apparatus for rendering an image and a rendering device are provided. The rendering method involves obtaining information about a sightline of a user, determining rendering quality based on the obtained information, and rendering a graphic image according to the determined rendering quality.

18 Claims, 14 Drawing Sheets

(56) References Cited

U.S. PATENT DOCUMENTS

| | | |
|---|---|---|
| 2011/0216078 A1 | 9/2011 | Blinzer |
| 2013/0128120 A1 | 5/2013 | Chanda |
| 2013/0321265 A1* | 12/2013 | Bychkov .................. G06F 3/017 345/156 |
| 2014/0098264 A1 | 4/2014 | Koike |
| 2014/0139667 A1 | 5/2014 | Kang |
| 2014/0361977 A1* | 12/2014 | Stafford ............. G02B 27/0093 345/156 |
| 2015/0109192 A1* | 4/2015 | Huang .................... G06F 3/013 345/156 |

* cited by examiner

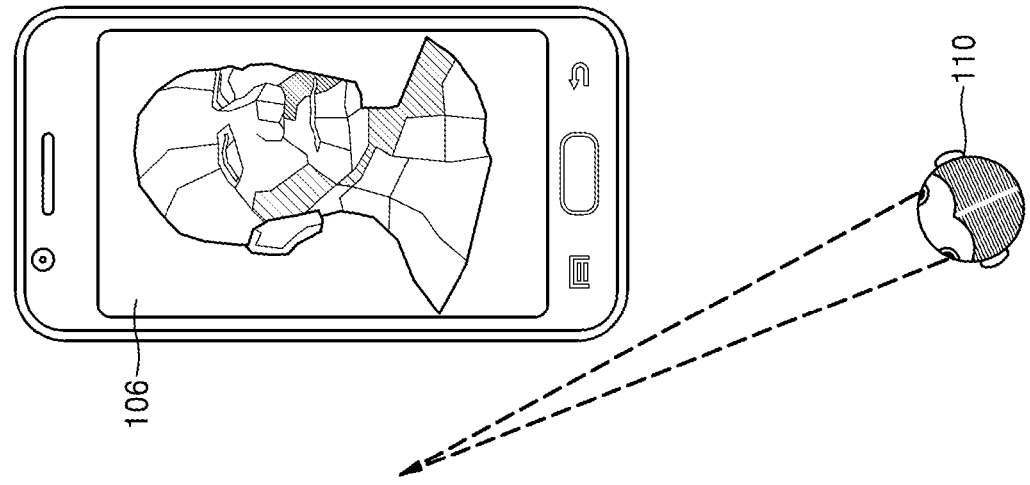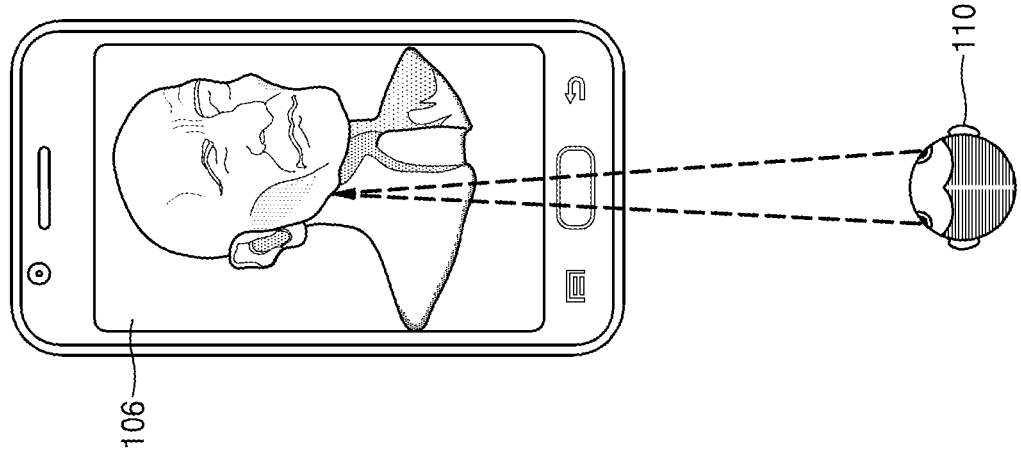

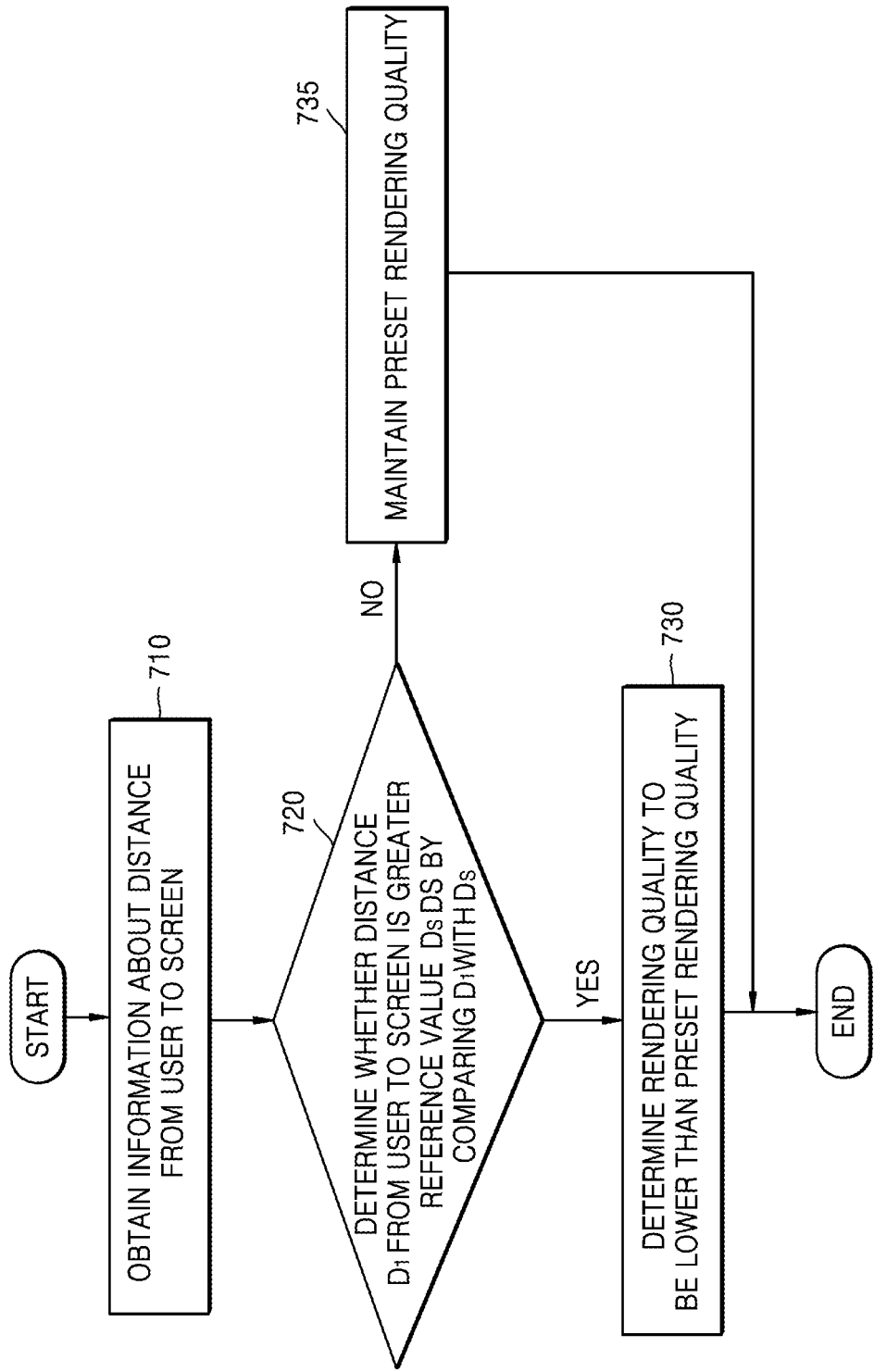

FIG. 13

| RENDERING QUALITY \ INFORMATION ABOUT RENDERING QUALITY | APPLICATION OF ANTI-ALIASING | SAMPLING RATE | NUMBER OF MIPMAP LEVELS | RESOLUTION | TESSELLATION LEVEL |
|---|---|---|---|---|---|
| PRESET RENDERING QUALITY | ON | 16 | 7 | 2880x1800 | Level 5 |
| NEW RENDERING QUALITY | OFF | 4 | 3 | 1920x1080 | Level 1 |

METHOD AND APPARATUS FOR CONTROLLING RENDERING QUALITY

CROSS-REFERENCE TO RELATED APPLICATION

This application claims the benefit under 35 USC 119(a) of Korean Patent Application No. 10-2014-0119370, filed on Sep. 5, 2014, in the Korean Intellectual Property Office, the entire disclosure of which is incorporated herein by reference for all purposes.

BACKGROUND

1. Field

The following description relates to a method and apparatus for controlling rendering quality in real time.

2. Description of Related Art

Graphics processing units (GPUs) are high-performance graphics processing apparatuses that generate an image to be displayed on a screen by converting primitives formed of one or more vertexes to pixels on the screen and calculating a color value suitable for each pixel. Three-dimensional (3D) graphics rendering may be programmed by using an application program interface (API) such as DirectX or OpenGL which are standard APIs.

An API may enable setting a level-of-detail, such as the rendering quality of three-dimensional (3D) graphics rendered in many operations of a rendering pipeline. An example of a measurement for rendering quality may be a sampling rate that indicates, when texture is applied to a pixel, how many pixels will be used to sample the texture. When sampling is performed using a relatively large number of pixels, an image on the screen may be processed to be smoother. Accordingly, as the sampling rate increases, a more precise rendering product may be obtained, but a relatively large amount of calculation may be also required. In other words, the rendering quality is proportional to the amount of calculation performed by a GPU.

An increase in the amount of calculation performed causes an increase in the consumption of power by the GPU. In other words, a trade-off relation exists between a quality of a rendering product and the power consumed by the CPU. A 3D rendering technique has been used to implement a special effect in 3D games, such as a 3D flight simulator. Recently, the 3D rendering technique is being applied to general user experience (UX) related to devices in order to have an eye-catching effect. Accordingly, the proportion of power consumption with respect to 3D rendering has been gradually increasing in recent devices.

The rendering quality may be set by developers at a program modeling stage or by a user when a program is executed. Accordingly, renderings are performed according to rendering qualities that are preset regardless of how a user determines to use a device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a rendering method involves obtaining information about a sightline of a user, determining rendering quality based on the obtained information, and rendering a graphic image according to the determined rendering quality.

The rendering quality may denote a level-of-detail of the graphic image displayed on a screen.

The information about the sightline may include at least one of a position of the sightline to a screen that displays the graphic image, a movement direction of the sightline to the screen, and a distance from the user to the screen.

The obtaining of the information about the sightline of the user may involve obtaining the information about the sightline of the user at predetermined time intervals.

The determining of the rendering quality may involve using a processor to compare information obtained at a first time point with information obtained at a second time point, and changing rendering quality of the graphic image based on a result of the comparing.

The information about the sightline of the user may include a distance from the eyes of the user to a screen that displays the graphic image. The comparing of the information obtained at the first time point with the information obtained at the second time point may involve comparing a distance from the eyes of the user to the screen obtained at the second time point with a reference value. The reference value may include at least one of the distance from the eyes of the user to the screen obtained at the first time point and a predetermined critical value.

The obtaining of the information about the sightline of the user further may involve obtaining an angle between a direction of the sightline and a direction of a normal line of a screen that displays the graphic image, by using the obtained information. The comparing of the information obtained at the first time point with the information obtained at the second time point may involve comparing the angle between the direction of the sightline of the user obtained at the second time point and the direction of the normal line of the screen, with a reference value. The reference value may include at least one of the direction of the sightline of the user obtained at the first time point and the direction of the normal line of the screen, and a predetermined critical value.

The information about the sightline of the user may include at least one of a position of the sightline to a screen that displays the graphic image and a movement direction of the sightline of the user. The determining of the rendering quality may involve determining whether the sightline of the user is directed toward the screen, based on the information about the sightline of the user, and in response to a determination that the sightline of the user is not directed toward the screen, determining the rendering quality to be lower than a preset rendering quality.

The general aspect of the rendering method may further involve, in response to a determination that the sightline of the user is directed toward the screen, obtaining a screen staring time that is a time during which the sightline of the user remains directed toward the screen, comparing the screen staring time with a predetermined critical value; and changing the rendering quality based on a result of the comparing.

The information about rendering quality may include at least one of a number of vertexes per object, an anti-aliasing level, a sampling rate, a mipmap level, a resolution, and a tessellation level.

The obtaining of the information about the sightline of the user may involve obtaining a distance from the user to a screen that displays the graphic image and an angle between a direction of the sightline of the user and a direction of a normal line of the screen. The determining of the rendering quality may involve determining the rendering quality based on a resulting value of Mathematical Formula 1 using the obtained distance and angle, $$w_1 \frac{1}{d} + w_2 \frac{1}{\theta},$$ [Mathematical Formula 1]

wherein, in Mathematical Formula 1, "d" denotes the distance from the user to the screen for displaying an image, "θ" denotes the angle between the direction of the sightline of the user and the direction of the normal line of the screen, "$w_1$" is a real number greater than or equal to 0 and denotes a weight to "d", and "$w_2$" is a real number greater than or equal to 0 and denotes a weight to "θ".

The rendering of the graphic image may involve rendering the graphic image displayed on the screen according to the rendering quality corresponding to a section to which the resulting value belongs, among rendering qualities allotted corresponding to respective sections divided by at least two critical values.

The determining of the rendering quality may involve determining the rendering quality by using the information about the sightline and biometric data of the user that is previously stored.

In another general aspect, an apparatus for controlling rendering quality includes an acquirer configured to acquire information about a sightline of a user, and a determiner configured to determine the rendering quality based on the obtained information.

The rendering quality may denote a level-of-detail of a graphic image that is displayed on a screen.

The acquirer may be configured to acquire the information about the sightline of the user at predetermined time intervals, and the determiner may be configured to compare information obtained at a first time point and information obtained at a second time point and changes the rendering quality of the graphic image based on a result of the comparing.

The information about the sightline of the user may include a distance from the eyes of the user to a screen that displays a graphic image, and the determiner may include a processor and may be configured to compare a distance from the eyes of the user to the screen obtained at the second time point with a reference value, and to change the rendering quality of the graphic image based on a result of the comparing. The reference value may include at least one of the distance from the eyes of the user to the screen obtained at the first time point and a predetermined critical value.

The acquirer may be configured to acquire an angle between a direction of the sightline and a direction of a normal line of a screen that displays a graphic image, by using the obtained information. The determiner may be configured to compare the angle between the direction of the sightline of the user obtained at the second time point and the direction of the normal line of the screen, with a reference value, and to determine a preset rendering quality of the graphic image based on a result of the comparing. The reference value may include at least one of the direction of the sightline of the user obtained at the first time point and the direction of the normal line of the screen, and a predetermined critical value.

The information about the sightline of the user may include at least one of a position of the sightline to a screen that displays a graphic image and a movement direction of the sightline of the user. The determiner may be configured to determine whether the sightline of the user is directed toward the screen, based on the information about the sightline of the user and, in response to a determination that the sightline of the user is not directed toward the screen, to determine the rendering quality to be lower than a preset rendering quality.

In another general aspect, a device includes a screen configured to display an image to a user, a detector configured to detect a sightline of the user with respect to the screen, and a processor configured to adjust rendering quality of the image based on the sightline of the user with respect to the screen.

The detector may be configured to detect an eye movement of the user.

The detector may be configured to detect a distance between the device and the user.

The detector may be configured to detect an angle between a normal line to the screen and a line extending between an eye of the user and the screen.

The detector may be configured to photograph the user and to determine an eye area of the user to detect the sightline of the user. The processor may include an acquirer configured to acquire information about the sightline of the user by using data obtained by converting the detected sightline to an electric signal, a determiner configured to determine the rendering quality based on the obtained information, and a renderer configured to render the graphic image on the screen based on the determined rendering quality.

Other features and aspects will be apparent from the following detailed description, the drawings, and the claims.

BRIEF DESCRIPTION OF THE DRAWINGS

FIGS. 6A and 6B are views for describing the example of method of determining rendering quality according to FIG. 5;

FIG. 7 is a flowchart illustrating another example of a method of determining rendering quality based on a distance between a user and a screen.

FIG. 13 is a view illustrating an example of a lookup table for rendering control according to rendering quality.

Figure 1:
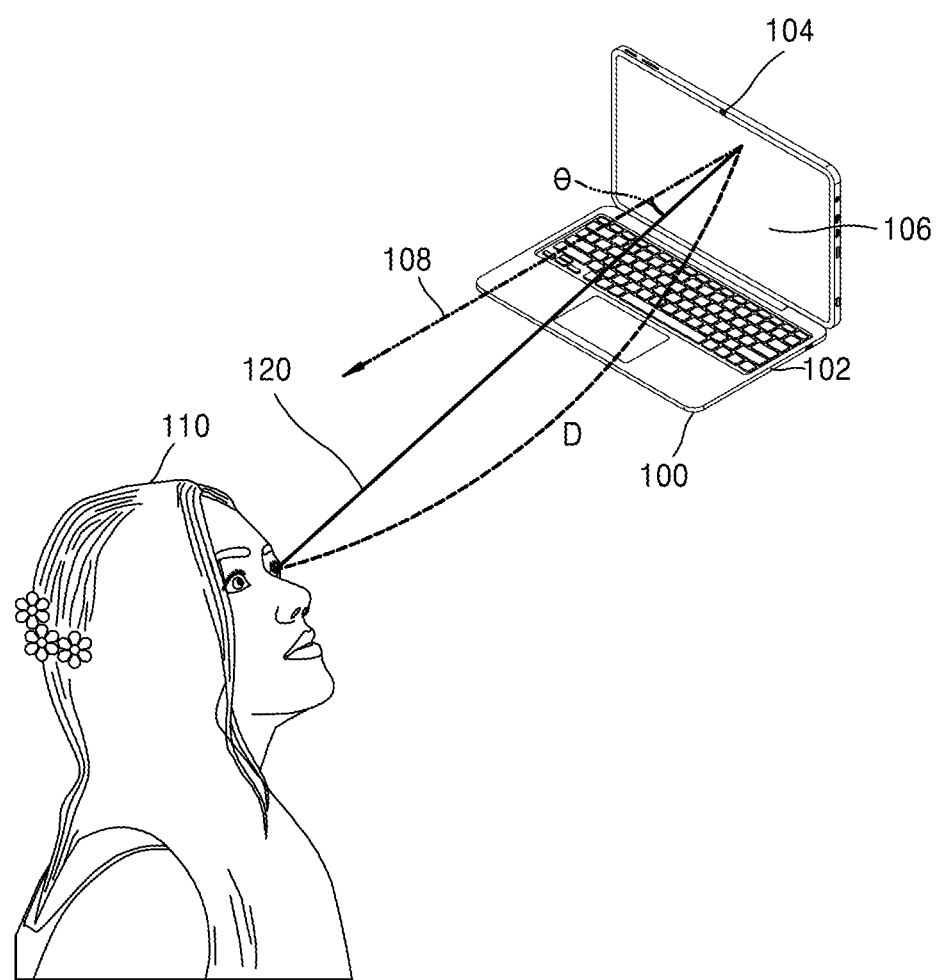
FIG. 1 is a view illustrating the overall concept of a system controlling rendering quality based on information about a sightline of a user according to one example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The method and apparatus according to examples of the present inventive concept are described in detail with reference to the accompanying drawings. However, the present inventive concept is not limited thereto, and it will be understood that various changes in form and details may be made therein without departing from the spirit and scope of the following claims. That is, descriptions of particular structures or functions may be presented merely for explaining examples of the present inventive concept.

Terms such as "first" and "second" are used herein merely to describe a variety of constituent elements, but the constituent elements are not limited by the terms. Such terms are used only for the purpose of distinguishing one constituent element from another constituent element. For example, without departing from the right scope of the present inventive concept, a first constituent element may be referred to as a second constituent element, and vice versa.

In the present specification, when a constituent element "connects" or is "connected" to another constituent element, the constituent element contacts or is connected to the other constituent element directly or through at least one of other constituent elements. Conversely, when a constituent element is described to "directly connect" or to be "directly connected" to another constituent element, the constituent element should be construed to be directly connected to another constituent element without any other constituent element interposed therebetween. Other expressions such as, "between" and "directly between", describing the relationship between the constituent elements, may be construed in the same manner.

Terms used in the present specification are used for explaining illustrative embodiments, not for limiting the present inventive concept. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Unless defined otherwise, all terms used herein including technical or scientific terms have the same meanings as those generally understood by those of ordinary skill in the art to which the present inventive concept may pertain. The terms as those defined in generally used dictionaries are construed to have meanings matching that in the context of related technology and, unless clearly defined otherwise, are not construed to be ideally or excessively formal.

In the present specification, the term "rendering quality" signifies a level of detail of a graphic image displayed on a screen. Information about rendering quality may include, for example, the number of vertexes per object, an anti-aliasing level, a sampling rate, a mipmap level, resolution and tessellation levels, and the like; however, the present disclosure is not limited thereto. When the rendering quality is determined, values of pieces of information about rendering quality, and an application thereof, may be determined.

Reference will now be made in detail to several embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Described below are a method and apparatus for controlling rendering quality in real time based on a state in which a user views a screen. The method and apparatus may use biometric data of a user to control the rendering quality. Further described below are a non-transitory computer readable storage medium having stored thereon a program, which when executed by a computer, performs the rendering quality control method as described.

FIG. 1 is a view illustrating the overall concept of a system controlling rendering quality based on information about a sightline 120 of a user 110 according to one embodiment of the present disclosure.

Referring to FIG. 1, a rendering apparatus 102 may automatically control rendering quality of a digital image embodied on a device 100 based on a state in which the user 110 views a screen 106 that displays a graphic image.

The device 100 may include, for example, a TV set, a smartphone, a personal computer (PC), a tablet PC, a laptop computer, an e-book terminals, a smart TV, a terminal for digital broadcasts, a personal digital assistant (PDA), a portable multimedia player (PMP), a navigation device, etc., but the present disclosure is not limited thereto.

The state in which the user 110 views the screen 106 displaying a graphic image may include, for example, whether the sightline 120 of the user 110 is directed toward the screen 106, a duration of the sightline 120 of the user 110 directed toward the screen 106, an angle between a direction of the sightline 120 of the user 110 and the screen 106, and a distance from the user 110 to the screen 106, but the present disclosure is not limited thereto. For example, the angle between the direction of the sightline 120 of the user 110 and the screen 106 may signify an angle between the direction of the sightline 120 of the user 110 and a normal line 108 of the screen 106. Also, for example, the distance from the user 110 to the screen 106 may signify a distance from the eyes of the user 110 to the screen 106.

An image sensing camera 104 may capture an image of the user 110 and recognize the eyes of the user 110 and thus detect the direction of the sightline 120 of the user 110 and the distance between the user 110 and the screen 106. The information about the direction of the sightline 120 may include the position of the sightline 120 with respect to the screen 106, a movement direction of the sightline 120, and the like.

The rendering apparatus 102 may lower its rendering quality compared to a preset rendering quality when the user 110 does not view the screen 106, the distance from the user 110 to the screen 106 is relatively far, the angle between the direction of the sightline 120 of the user 110 and the normal line 108 of the screen 106 is relatively large, and the like. The preset rendering quality may signify rendering quality that is determined at a program modeling stage or set according to a user setting during program execution. Accordingly, when high quality graphics are not needed, the rendering apparatus 102 may reduce unnecessary use of resources by lowering the preset rendering quality.

Figure 2:
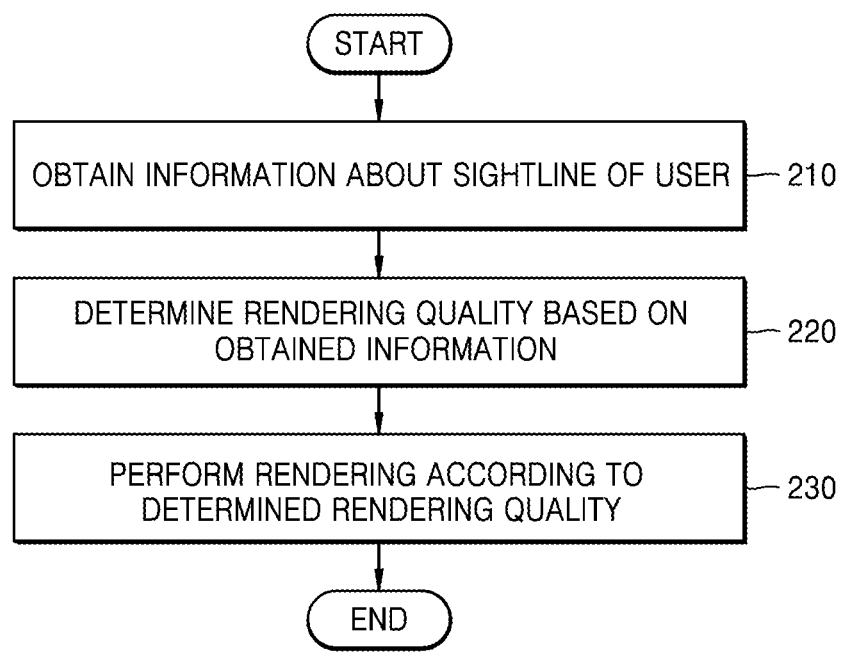
FIG. 2 is a flowchart illustrating an example of a rendering method.

FIG. 2 is a flowchart illustrating an example of a rendering method.

In Operation 210, the rendering apparatus 102 obtains the information about the sightline 120 of the user 110.

The information about the sightline 120 of the user 110 may include at least one of a position of the sightline 120 with respect to the screen 106, a movement direction of the sightline 120 with respect to the screen 106, and a distance from the user 110 to the screen 106.

According to one embodiment, the rendering apparatus 102 may obtain the information at predetermined time intervals.

The rendering apparatus 102 may obtain information about the direction of the sightline 120 of the user 110 from an eye-detection sensor. The information about the sightline 120 of the user 110 may include a position of the sightline with respect to the screen 106, a movement direction of the sightline 120, and the like.

The rendering apparatus 102 may obtain information about the distance between the user 110 and the screen 106 from a distance measuring sensor. For example, the rendering apparatus 102 may obtain information about the distance between the eyes of the user 110 and the screen 106.

In Operation 220, the rendering apparatus 102 determines rendering quality based on the obtained information.

The rendering quality indicates a level of detail of a graphic image displayed on the screen 106.

The rendering apparatus 102 may determine rendering quality by using at least one of whether the sightline 120 of the user 110 is directed toward the screen 106, the distance between the user 110 and the screen 106, and the angle between the direction of the sightline 120 of the user 110 and the screen 106.

For example, when the user 110 does not view the screen 106, the rendering apparatus 102 may lower rendering quality compared to a preset rendering quality. A detailed description thereof is described below with reference to FIGS. 5 and 6.

According to another example, when the distance from the user 110 to the screen 106 is relatively far, the rendering apparatus 102 may lower the rendering quality compared to the preset rendering quality. A detailed description thereof is described below with reference to FIGS. 7 and 8.

According to yet another example, when the angle between the direction of the sightline 120 of the user 110 and the normal line 108 of the screen 106 is relatively large, the rendering apparatus 102 may lower the rendering quality compared to the preset rendering quality. A detailed description thereof is described below with reference to FIGS. 9 and 10.

According to yet another example, when the user 110 stares at the screen 106 for a relatively long time, the rendering apparatus 102 may lower the rendering quality compared to the preset rendering quality. A detailed description thereof is described below with reference to FIG. 11.

The rendering apparatus 102 may obtain information about the sightline 120 at predetermined time intervals and may compare information obtained at a first time point with information obtained at a second time point. The rendering apparatus 102 may change rendering quality of a graphic image based on a result of the comparison.

The rendering apparatus 102 may determine whether to change a preset rendering quality of a graphic image based on the obtained information. In the event that the rendering quality is determined to be changed, the rendering apparatus 102 may determine a new rendering quality. When the rendering quality is not determined to be changed, the rendering apparatus 102 may maintain the preset rendering quality.

The rendering apparatus 102 according to one example may determine whether to change the rendering quality by comparing currently obtained information with previously obtained information. A detailed description thereof is described below with reference to FIG. 3.

The rendering apparatus 102 according to another example may determine whether to change the rendering quality by comparing the obtained information with a critical value. A detailed description thereof is described below with reference to FIG. 4.

When the rendering quality is determined to be changed, the rendering apparatus 102 according to an one example may determine a numerical value of information about the new rendering quality, and an application thereof, by using the information about the preset rendering quality.

For example, when the information about rendering quality is the number of vertexes per object, the rendering apparatus 102 may determine a value calculated by Mathematical Formula 2 as the number of vertexes per object according to the new rendering quality.

$$Q_{new} = c \times Q_{curr} \qquad \text{[Mathematical Formula 2]}$$

In Mathematical Formula 2, "$Q_{curr}$" denotes the number of vertexes per object according to the preset rendering quality. "$Q_{new}$" denotes the number of vertexes per object according to the new rendering quality. "c" denotes a coefficient to adjust the value with respect to the information about rendering quality.

When "c" is greater than 0 and less than 1, the number of vertexes per object according to the new rendering quality is determined to be lower than the number of vertexes per object according to the preset rendering quality. "c" may be previously set and stored before a program starts. For example, "c" may be determined based on a user input.

When "$Q_{new}$" is not a natural number, a natural number that is the most approximate to "$Q_{new}$" may be determined to be the number of vertexes per object according to the new rendering quality.

When the rendering quality is determined to be changed, the rendering apparatus 102 according to another example may determine a numerical value of the information about the new rendering quality, and an application thereof, by using the obtained information.

For example, when the information about rendering quality is the number of vertexes per object and the obtained information is the distance between the user 110 and the screen 106, the rendering apparatus 102 may determine the value calculated by Mathematical Formula 3 as the number of vertexes per object according to the new rendering quality.

$$Q_{new} = c_1 \times \frac{1}{D} \times Q_{curr} \qquad \text{[Mathematical Formula 3]}$$

In Mathematical Formula 3, "$Q_{curr}$" denotes the number of vertexes per object according to the preset rendering quality. "$Q_{new}$" denotes the number of vertexes per object according to the new rendering quality. "$c_1$" denotes a coefficient to adjust a value with respect to the information about rendering quality. "D" denotes the distance between the user 110 and the screen 106. In other words, as the distance between the user 110 and the screen 106 increases, the rendering apparatus 102 may determine the number of vertexes per object according to the rendering quality.

When "$Q_{new}$" is not a natural number, a natural number that is the most approximate to "$Q_{new}$" may be determined to be the number of vertexes per object according to the new rendering quality.

In another example, when the information about rendering quality is the number of vertexes per object and the obtained information is the angle between the direction of the sightline 120 of the user 110 and the screen 106, the rendering apparatus 102 may determine a value calculated by Mathematical Formula 4 as the number of vertexes per object according to the new rendering quality.

$$Q_{new} = c_2 \times \frac{1}{\theta} \times Q_{curr} \qquad \text{[Mathematical Formula 4]}$$

In Mathematical Formula 4, "$Q_{curr}$" denotes the number of vertexes per object according to the preset rendering quality. "$Q_{new}$" denotes the number of vertexes per object according to the new rendering quality. "$c_2$" denotes the coefficient to adjust the value with respect to the information about rendering quality. "$\theta$" denotes the angle between the direction of the sightline 120 of the user 110 and the screen 106. In other words, as the angle between the direction of the sightline 120 of the user 110 and the screen 106 increases, the rendering apparatus 102 may determine the number of vertexes per object according to rendering quality to be lower.

When "$Q_{new}$" is not a natural number, a natural number that is the most approximate to "$Q_{new}$" may be determined to be the number of vertexes per object according to the new rendering quality.

When the rendering quality is determined to be changed, the rendering apparatus 102 according to another example may determine a numerical value of the information about the new rendering quality, and an application thereof, by using biometric data such as eyesight of the user 110.

For example, the coefficient to adjust the value with respect to the information about rendering quality of Mathematical Formula 2 to Mathematical Formula 4 may be determined based on the biometric data of the user 110.

The biometric data of the user 110 may be input prior to the execution of a program and then may be stored in a storage unit (not shown).

When the rendering quality is determined to be changed, the rendering apparatus 102 according to another example may determine a numerical value of the information about the new rendering quality, and an application thereof, by using a temperature of the device 100.

For example, the coefficient to adjust the value with respect to the information about rendering quality of Mathematical Formula 2 to Mathematical Formula 4 may be determined based on the temperature of the device 100. The rendering apparatus 102 may secure stability of the device 100 by reducing a processing load on a graphics processing unit (GPU) as the temperature of the device 100 increases.

When the rendering quality is determined to be changed, the rendering apparatus 102 according to another example may determine a numerical value of the information about the new rendering quality, and an application thereof, by using at least one of the distance between the user 110 and the screen 106, the angle between the direction of the sightline 120 of the user 110 and the screen 106, and the biometric data of the user 110.

In Operation 230, the rendering apparatus 102 performs rendering of the graphic image displayed on the screen 106 according to the determined rendering quality.

The rendering apparatus 102 may perform rendering by applying the determined rendering quality to each of the operations of the rendering pipeline that may set rendering quality.

The rendering pipeline signifies an operational method to express a 3D graphic image in a 2D raster image. The raster, which is one of methods of expressing image information in a computer, signifies that an image is formed of pixels in the form of a 2D array, the pixels is combined, and one piece of image information is expressed by the pixels at a constant interval. In other words, the rendering pipeline signifies a process of creating a 2D image by using geometrical expression of a 3D world and a virtual camera defining a viewpoint seeing the 3D world.

The information indicating the rendering quality may include at least one of an anti-aliasing level, a sampling rate, a mipmap level, and resolution and tessellation levels, but the present disclosure is not limited thereto. When the rendering quality is determined, values of pieces of information about rendering quality, and an application thereof, may be determined. A detailed description thereof is described below with reference to FIG. 13.

The anti-aliasing, which is an image processing method to remove step-like boundaries, signifies a function to make the boundaries of an image smooth by filling the boundaries of the image step by step with an intermediate color between a background color and an image color.

The rendering apparatus 102 according to one example may determine an application of anti-aliasing and a degree of the application based on the determined rendering quality. For example, the rendering apparatus 102 may perform rendering by applying the determined anti-aliasing level to a rasterization operation of the rendering pipeline.

The sampling rate signifies how many pixels are used to sample texture.

The rendering apparatus 102 according to one example may determine how many pixels are used to sample texture based on the determined rendering quality. For example, the rendering apparatus 102 may perform rendering by applying the determined sampling rate to the rasterization operation of a rendering pipeline.

The mipmap is a collection of bitmap images formed of a basic texture and textures that are obtained by previously and consecutively reducing the basic texture for a purpose of improving a rendering speed in the field of 3D graphic texture mapping.

The rendering apparatus 102 according to one example may determine the number of mipmap levels based on the determined rendering quality. For example, the rendering apparatus 102 may perform rendering by applying the determined number of mipmap levels to a pixel shader operation of the rendering pipeline.

The resolution denotes how many pixels or dots are used to express an image, that is, how many pixels are included in one image.

The rendering apparatus 102 according to one example may determine resolution based on the determined rendering quality, that is, how many pixels are used to express an object in a 3D space. For example, the rendering apparatus 102 may perform rendering by applying the determined resolution to the pixel shader operation of the rendering pipeline.

The tessellation denotes completely covering a plane or space without a gap or overlapping, by using one or more shapes. Accordingly, a curved portion of an object may be expressed in further detail by dividing a polygon into a lot of small pieces.

The rendering apparatus 102 according to one example may determine a tessellation level based on the determined rendering quality. For example, the rendering apparatus 102 may perform rendering by applying the determined tessellation level to a tessellation operation of the rendering pipeline.

Figure 3:
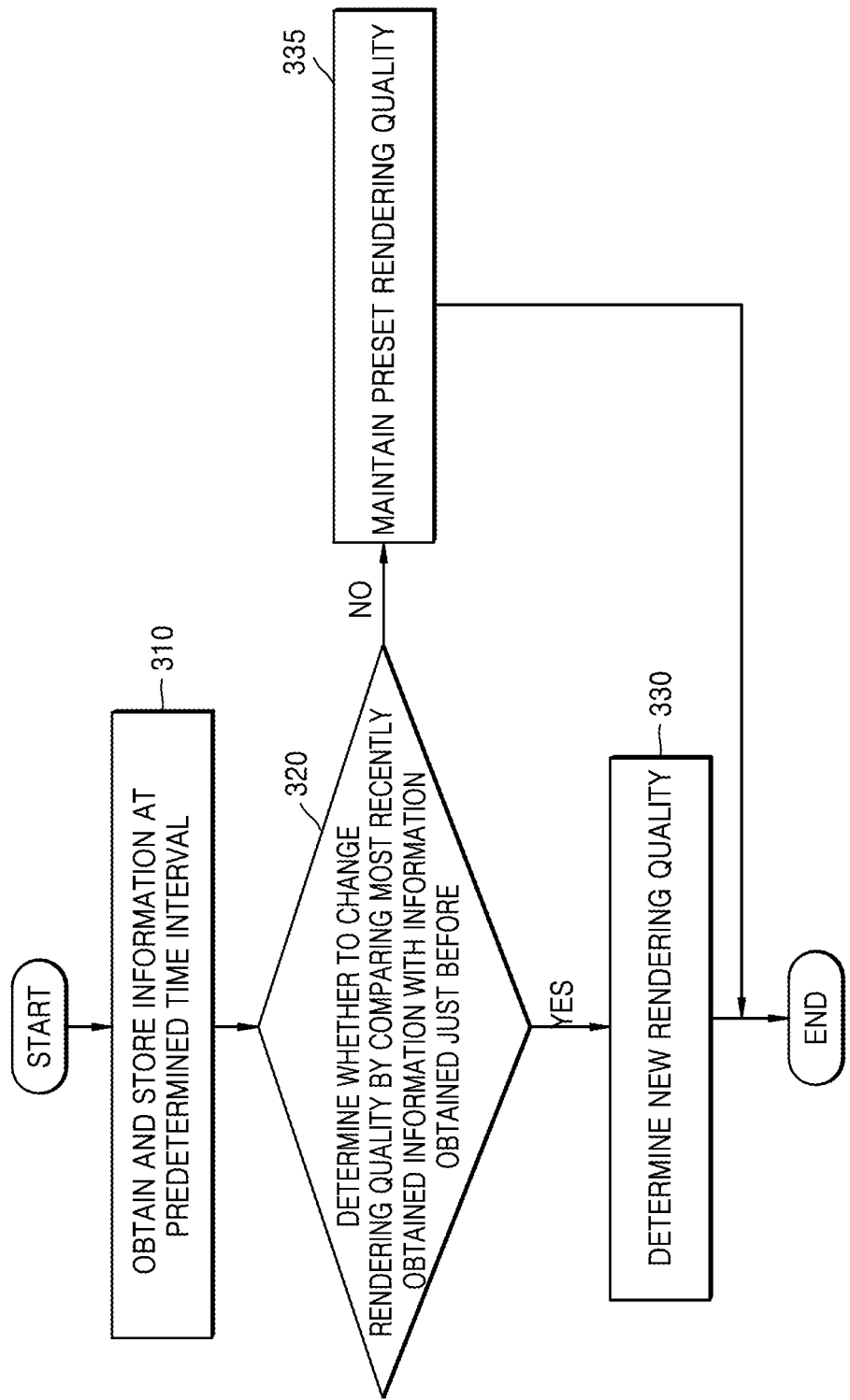
FIG. 3 is a flowchart illustrating an example of a method of determining rendering quality.

FIG. 3 is a flowchart illustrating an example of a method for determining rendering quality.

In Operation 310, the rendering apparatus 102 may obtain and store information about the sightline 120 of the user 110 at a predetermined time interval.

The rendering apparatus 102 may temporarily store the obtained information in the storage.

In Operation 320, the rendering apparatus 102 may determine whether to change the rendering quality by comparing information obtained at a first time point that is the most recent time point with information obtained at a second time point that is a time point just before the first time point.

According to an embodiment, when the obtained information is a distance from the eyes of the user 110 to the screen 106, the rendering apparatus 102 may compare a distance from the distance from the eyes of the user 110 to the screen 106 obtained at the first time point with a distance from the eyes of the user 110 to the screen 106 obtained at the second time point, and may determine whether to change the rendering quality.

For example, when Mathematical Formula 5 is satisfied, the rendering apparatus 102 may determine to change the rendering quality.

$$D_1 > D_0 + D_{th} \qquad \text{[Mathematical Formula 5]}$$

In Mathematical Formula 5, "$D_0$" denotes the distance from the eyes of the user 110 to the screen 106 obtained at the second time point. "$D_1$" denotes the distance from the eyes of the user 110 to the screen 106 obtained at the first time point. "$D_{th}$" denotes a critical value, which may be previously set and stored before a program starts.

In other words, the rendering apparatus 102 may determine to change the rendering quality when the distance from the eyes of the user 110 to the screen 106 obtained at the first time point is greater, by the preset critical value, than the distance from the eyes of the user 110 to the screen 106 obtained at the second time point.

In an example, the critical value "$D_{th}$" may be set based on a user input.

In another example, the critical value "$D_{th}$" may be set based on biometric data such as the eyesight of the user 110.

In yet another example, when the obtained information is the angle between the direction of the sightline 120 and the direction of the normal line 108 of the screen 106, the rendering apparatus 102 may determine whether to change the rendering quality by comparing the angle between the direction of the sightline obtained at the first time point that is the most recent time point with the direction of the normal line 108 of the screen 106, and the angle between the direction of the sightline obtained at the second time point that is a time point just before the first time point and the direction of the normal line 108 of the screen 106.

The normal line 108 refers to the line that forms 90° with the surface of the surface of the screen 106. That is, the line is perpendicular with the surface of the screen 106.

For example, when Mathematical Formula 6 is met, the rendering apparatus 102 may determine to change the rendering quality.

$$\theta_1 > \theta_0 + \theta_{th} \qquad \text{[Mathematical Formula 6]}$$

In Mathematical Formula 6, "$\theta_0$" denote the angle between the direction of the sightline 120 obtained at the second time point and the direction of the normal line of the screen 106. "$\theta_1$" denotes the angle between the direction of the sightline 120 obtained at the first time point and the direction of the normal line of the screen 106. "$\theta_{th}$" denotes the critical value, which may be previously set and stored before a program starts.

In other words, the rendering apparatus 102 may determine to change the rendering quality when the angle between the direction of the sightline 120 obtained at the first time point and the direction of the normal line of the screen 106 is greater, by the preset critical value, than the angle between the direction of the sightline 120 obtained at the second time point and the direction of the normal line of the screen 106.

In an example, the critical value "$\theta_{th}$" may be set based on a user input.

In another example, the critical value "$\theta_{th}$" may be set based on the biometric data such as the eyesight of the user 110.

In yet another example, when the obtained information is the information about the direction of the sightline 120 of the user 110, and the information about the distance from the user 110 to the screen 106, the rendering apparatus 102 may determine whether to change the rendering quality by comparing a resulting value of calculation of solving a predetermine formula with respect to the information about the direction of the sightline obtained at the first time point that is the most recent time point, and the information about the distance, and a resulting value of calculation of solving a predetermined formula with respect to the information about the direction of the sightline obtained at the second time point that is a time point just before the first time point and the information about the distance. A detailed description thereof is described below with reference to FIG. 12.

When the rendering apparatus 102 determines to change the rendering quality, Operation 330 is performed. When the rendering apparatus 102 does not determine to change the rendering quality, Operation 335 is performed.

In Operation 330, the rendering apparatus 102 may determine the new rendering quality.

When the rendering quality is determined to be changed, the rendering apparatus 102 according to one example determines a numerical value of the information about the new rendering quality, and an application thereof, by using the preset information about rendering quality. For example, the rendering apparatus 102 may determine the value calculated by Mathematical Formula 2 as a numerical value of the information about the new rendering quality.

When the rendering quality is determined to be changed, the rendering apparatus 102 according to another example determines a numerical value of the information about the new rendering quality, and an application thereof, by using the obtained information. For example, when the obtained information is the distance between the user 110 and the screen 106, the rendering apparatus 102 may determine the value calculated by Mathematical Formula 3 as a numerical value of the information about the new rendering quality. In another example, when the obtained information is the angle between the direction of the sightline 120 of the user 110 and the screen 106, the rendering apparatus 102 determines the value calculated by Mathematical Formula 4 as a numerical value of the information about the new rendering quality.

Also, when the rendering quality is determined to be changed, the rendering apparatus 102 according to another example determines a numerical value of the information about the new rendering quality, and an application thereof, by using the biometric data such as the eyesight of the user 110. For example, the coefficient to adjust the value with respect to the information about rendering quality by Mathematical Formula 2 to Mathematical Formula 4 may be determined based on the biometric data of the user 110.

When the rendering quality is determined to be changed, the rendering apparatus 102 according to another example determines a numerical value of the information about the new rendering quality, and an application thereof, by using the temperature of the device 100. For example, the coefficient to adjust the value with respect to the information about rendering quality by Mathematical Formula 2 to Mathematical Formula 4 may be determined based on the temperature of the device 100.

When the rendering quality is determined to be changed, the rendering apparatus 102 according to another example determines a numerical value of the information about the new rendering quality, and an application thereof, by using at least two of the distance between the user 110 and the screen 106, the angle between the direction of the sightline 120 of the user 110 and the screen 106, and the biometric data of the user 110.

In Operation 335, the rendering apparatus 102 may maintain the preset rendering quality.

Figure 4:
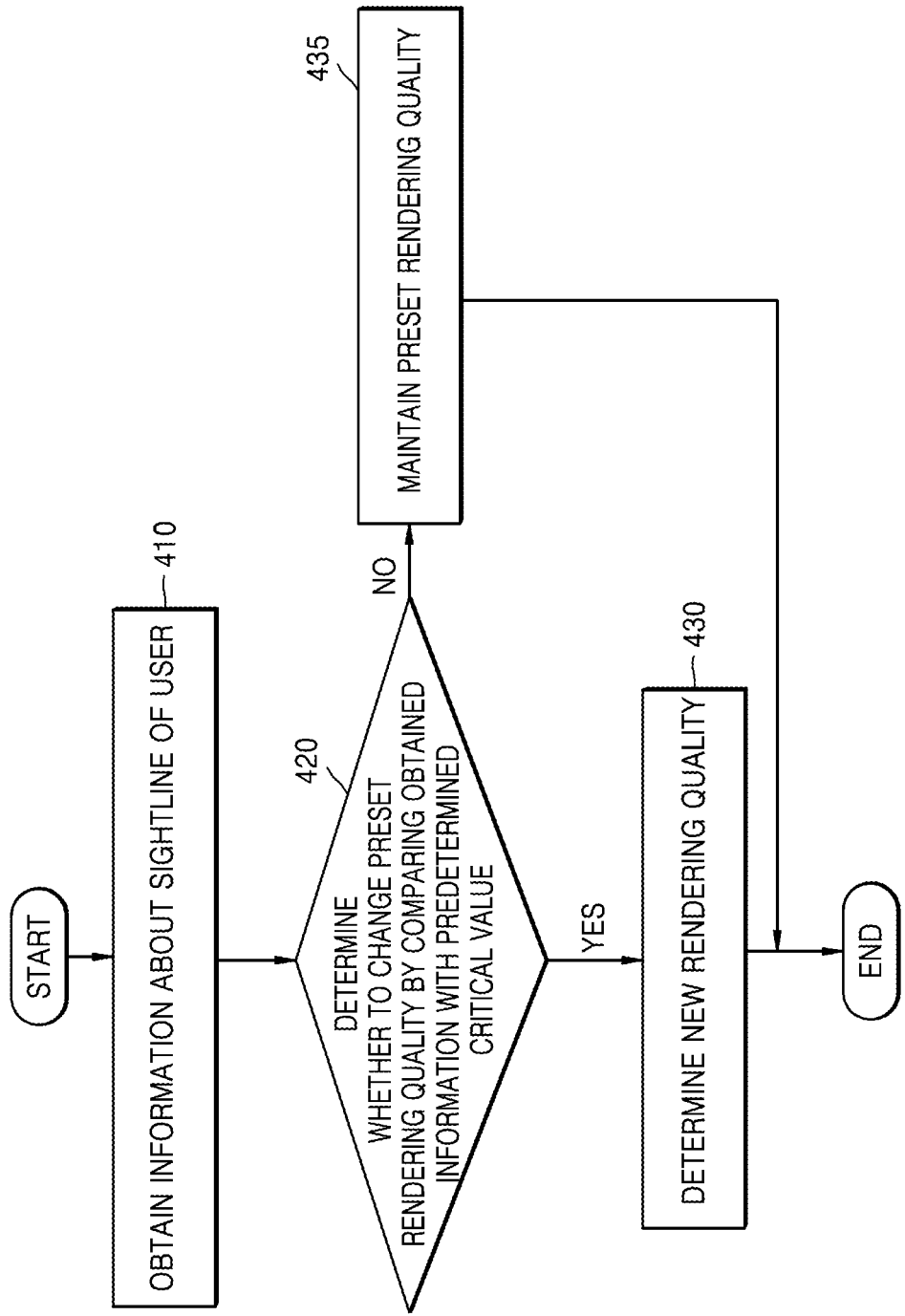
FIG. 4 is a flowchart illustrating an example of a method of determining rendering quality.

FIG. 4 is a flowchart illustrating another example of a method for determining rendering quality.

In Operation 410, the rendering apparatus 102 may obtain information about the sightline 120 of the user 110.

Since Operation 410 of FIG. 4 identically corresponds to Operation 210 of FIG. 2, a redundant description thereto is omitted.

In Operation 420, the rendering apparatus 102 may determine whether to change rendering quality by comparing the obtained information with a predetermined critical value.

According to one example, when the obtained information is the distance from the eyes of the user 110 to the screen 106, the rendering apparatus 102 determines whether to change the rendering quality by comparing the obtained distance from the eyes of the user 110 to the screen 106 with the critical value.

For example, when Mathematical Formula 7 is met, the rendering apparatus 102 may determine to the rendering quality.

$$D_1 > D_{th} \qquad \text{[Mathematical Formula 7]}$$

In Mathematical Formula 7, "$D_1$" denotes the distance from the eyes of the user 110 to the screen 106. "$D_{th}$" denotes the critical value, which may be previously set and stored before a program starts.

In other words, when the distance from the eyes of the user 110 to the screen 106 is greater than the preset critical value, the rendering apparatus 102 may determine to change the rendering quality.

In an example, the critical value "$D_{th}$" may be set based on a user input.

In another example, the critical value "$D_{th}$" may be set based on the biometric data such as the eyesight of the user 110.

According to yet another example, when the obtained information is the angel between the direction of the sightline 120 and the direction of the normal line of the screen 106, the rendering apparatus 102 may determine whether to change the rendering quality by comparing the obtained angle between the direction of the sightline 120 and the direction of the normal line of the screen 106 with a predetermined critical value.

For example, when Mathematical Formula 8 is met, the rendering apparatus 102 may determine to change the rendering quality.

$$\theta_1 > \theta_{th} \qquad \text{[Mathematical Formula 8]}$$

In Mathematical Formula 8, "$\theta_1$" denotes the angle between the direction of the sightline 120 and the direction of the normal line of the screen 106. "$\theta_{th}$" denotes the critical value, which may be previously set and stored before a program starts.

In other words, when the angle between the direction of the sightline 120 and the direction of the normal line of the screen 106 is greater than the preset critical value, the rendering apparatus 102 may determine to change the rendering quality.

In an example, the critical value "$\theta_{th}$" may be set based on a user input.

In another example, the critical value "$\theta_{th}$" may be set based on the biometric data such as the eyesight of the user 110.

According to another example, the obtained information is the information about the direction of the sightline 120 of the user 110, and the information about the distance from the user 110 to the screen 106, the rendering apparatus 102 may determined whether to change the rendering quality by comparing a resulting value of calculation of solving a predetermined formula with respect to the obtained information about the direction of the sightline 120 and the obtained information about the distance, with a predetermined critical value. A detailed description thereto is described below with reference to FIG. 12.

When the rendering apparatus 102 determines to change the rendering quality, Operation 430 is performed. When the rendering apparatus 102 does not determine to change the rendering quality, Operation 435 is performed.

In Operation 430, the rendering apparatus 102 may determine the new rendering quality.

Since Operation 430 of FIG. 4 identically corresponds to Operation 330 of FIG. 3, a redundant description thereof is omitted.

In Operation 435, the rendering apparatus 102 may maintain the preset rendering quality.

Figure 5:
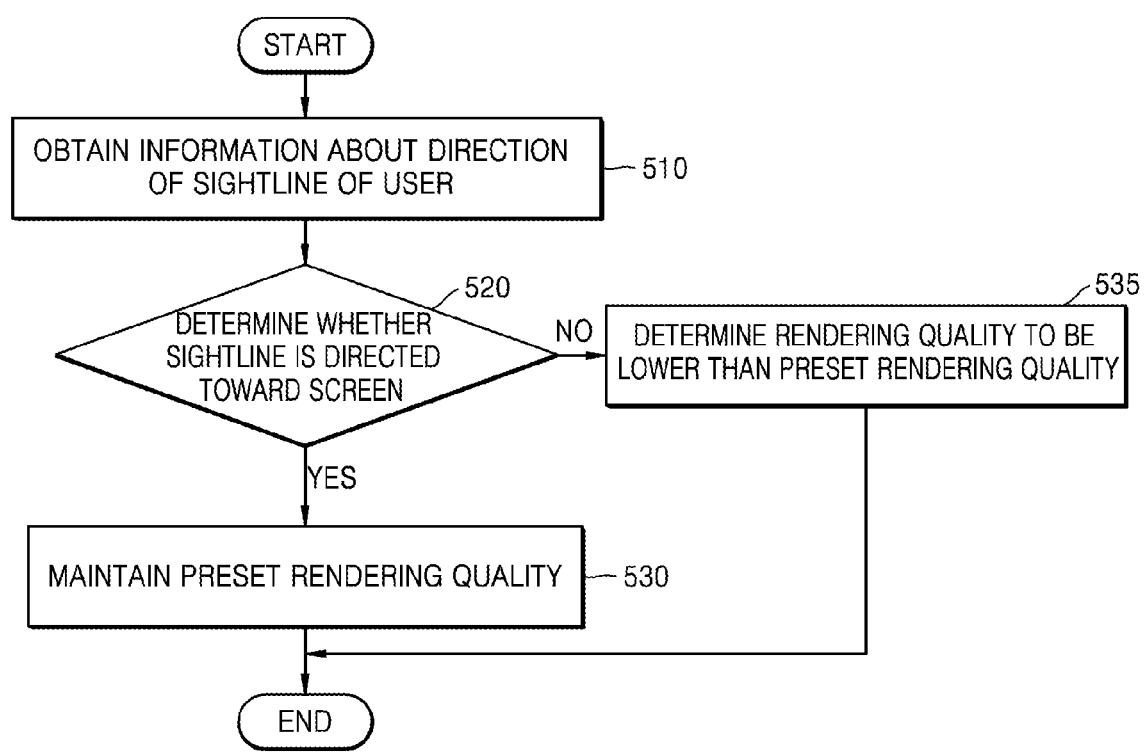
FIG. 5 is a flowchart for describing an example of a method of determining rendering quality based on whether a sightline of a user is directed toward a screen.

FIG. 5 is a flowchart illustrating an example of a method for determining rendering quality based on whether a sightline of a user is directed toward a screen.

In Operation 510, the rendering apparatus 102 may obtain the information about the direction of the sightline 120 of the user 110.

The information about the direction of the sightline 120 may include at least one of the position of the sightline 120 with respect to the screen 106 and the movement direction of the sightline 120.

In Operation 520, the rendering apparatus 102 may determine whether the sightline 120 of the user 110 is directed toward the screen 106.

For example, when the position of the sightline 120 with respect to the screen 106 is within a predetermined range from the screen 106, the rendering apparatus 102 may determine that the sightline 120 of the user 110 is directed toward the screen 106. In other words, the rendering apparatus 102 may determine that the user 110 looks at the screen 106.

In another example, when the movement direction of the sightline 120 with respect to the screen 106 is within a predetermined range, the rendering apparatus 102 may determine that the sightline 120 of the user 110 is directed toward the screen 106. In other words, the rendering apparatus 102 may determine that the user 110 looks at the screen 106.

When the rendering apparatus 102 determines that the sightline 120 of the user 110 is directed toward the screen 106, Operation 530 is performed. When the rendering apparatus 102 does not determine that the sightline 120 of the user 110 is directed toward the screen 106, Operation 535 is performed.

In Operation 530, the rendering apparatus 102 may maintain the preset rendering quality. In other words, the rendering apparatus 102 may perform rendering according to the preset rendering quality.

In Operation 535, the rendering apparatus 102 may determine the rendering quality to be lower than the preset rendering quality.

For example, the rendering apparatus 102 may determine the value calculated by Mathematical Formula 2 as a numerical value of the information about the new rendering quality. In Mathematical Formula 2, "c" is a constant that is greater than 0 and less than 1.

When the rendering apparatus 102 obtains again the information about the direction of the sightline 120 and determines that the sightline 120 of the user 110 is directed toward the screen 106, the rendering quality may be changed back to the preset rendering quality.

As described above, when the user 110 does not look at the screen 106, the rendering apparatus 102 may lower the rendering quality. Accordingly, the rendering apparatus 102 may reduce power consumed by a GPU.

FIGS. 6A and 6B are views for illustrating the example of the method of determining rendering quality according to FIG. 5.

Referring to FIG. 6A, the sightline 120 of the user 110 is directed toward the screen 106 that displays a graphic image.

When the sightline 120 of the user 110 is directed toward the screen 106, the rendering apparatus 102 may perform rendering according to the preset rendering quality.

Referring to FIG. 6B, the sightline 120 of the user 110 is not directed toward the screen 106 where a graphic image is displayed.

When the sightline 120 of the user 110 is not directed toward the screen 106, the rendering apparatus 102 may perform the rendering according to a rendering quality that is lower than the preset rendering quality. In other words, when the sightline 120 of the user 110 is not directed toward the screen 106, the user 110 is not looking at the graphic image and does not recognize the graphic image. Accordingly, while the sightline 120 of the user 110 is not directed toward the screen 106, high rendering quality is not necessary. Accordingly, the rendering apparatus 102 may lower the rendering quality and thus reduce the unnecessary use of resources.

On the other hand, when the sightline 120 of the user 110 is directed toward again the screen 106, the rendering apparatus 102 may change the rendering quality to the preset rendering quality, as illustrated in FIG. 6A.

FIG. 7 is a flowchart illustrating an example of a method for determining rendering quality based on a distance between the user 110 and the screen 106.

In Operation 710, the rendering apparatus 102 may obtain the distance from the user 110 to the screen 106.

The information about the distance from the user 110 to the screen 106 may be a distance from the eyes of the user 110 to a position on the screen 106. The position on the screen 106 may include any one position within a predetermined range from the screen 106.

In Operation 720, the rendering apparatus 102 may determine whether the distance from the user 110 to the screen 106 is greater than a reference value by comparing the distance from the user 110 to the screen 106 with the reference value.

According to an example, the reference value may be information obtained just before the most recent distance information is obtained.

In this case, when Mathematical Formula 5 is met, the rendering apparatus 102 may determine to change the rendering quality. In other words, the rendering apparatus 102 may determine to change the rendering quality when the distance from the eyes of the user 110 to the screen 106 obtained at the first time point that is the most recent time point is greater, by the preset critical value or higher, than the distance from the eyes of the user 110 to the screen 106 obtained at the second time point that is a time point just before the first time point.

According to another example, the reference value may be the preset critical value.

In this case, when Mathematical Formula 7 is met, the rendering apparatus 102 may determine to change the rendering quality. In other words, the rendering apparatus 102 may determine to change the rendering quality when the distance from the eyes of the user 110 to the screen 106 is greater than the preset critical value.

When the distance from the user 110 to the screen 106 is determined to be greater than the reference value, Operation 730 is performed. When the distance from the user 110 to the screen 106 is determined to be less than the reference value, Operation 735 is performed.

In Operation 730, the rendering apparatus 102 determines the rendering quality to be lower than the preset rendering quality.

The rendering apparatus 102 according to one example may determine the value calculated by Mathematical Formula 2 as the numerical value of the information about the new rendering quality. In Mathematical Formula 2, "c" is a constant that is greater than 0 and less than 1.

The rendering apparatus 102 according to one example may determine the value calculated by Mathematical Formula 3 as the numerical value of the information about the new rendering quality. In Mathematical Formula 3, $$\text{"} c_1 \times \frac{1}{D} \text{"}$$

is a number greater than 0 and less than 1.

The rendering apparatus 102 may perform rendering according to the determined new rendering quality.

When the rendering apparatus 102 obtains again the distance information and determines that the distance from the user 110 to the screen 106 is less than the reference value, the rendering apparatus 102 may change the rendering quality back to the preset rendering quality. The preset rendering quality signifies rendering quality that is determined by a program modeling operation or set by a user setting when a program is executed.

In Operation 735, the rendering apparatus 102 may maintain the preset rendering quality. In other words, the rendering apparatus 102 may perform rendering according to the preset rendering quality.

As described above, when the user 110 is located far from the screen 106, the rendering apparatus 102 may lower the rendering quality. Accordingly, the rendering apparatus 102 may reduce power consumed by a GPU.

Figure 8A:
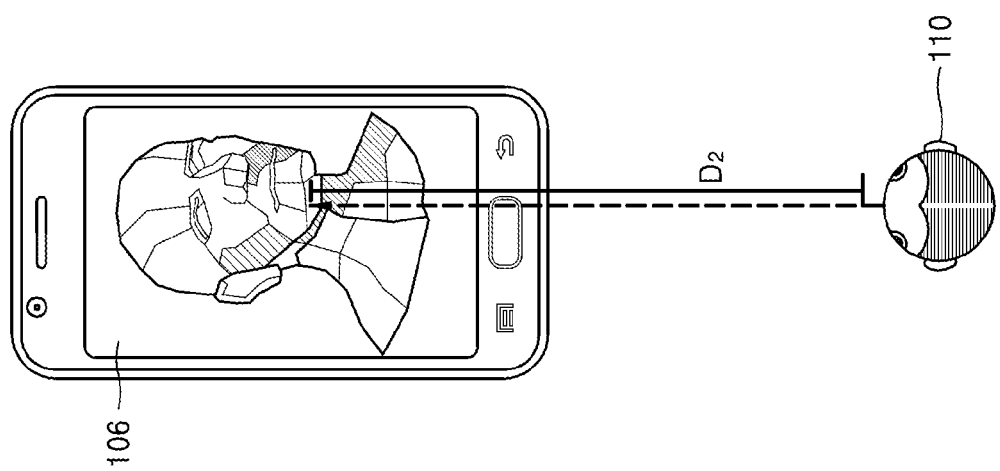
FIGS. 8A and 8B are views for describing the example of method of determining rendering quality according to FIG. 7.
Figure 8B:
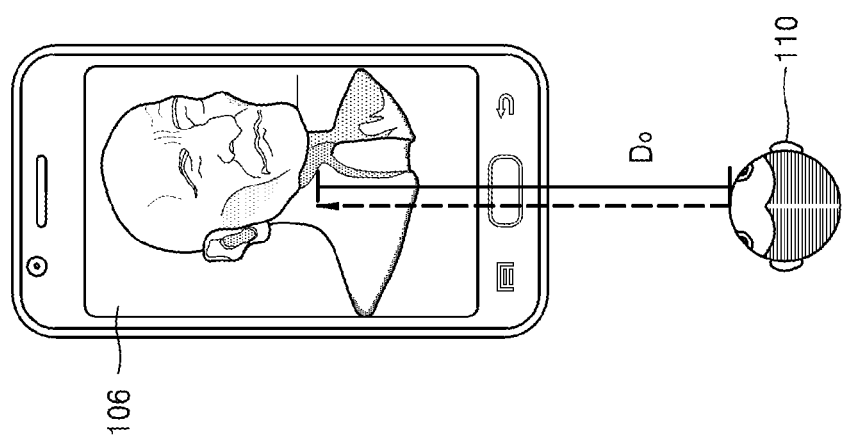

FIGS. 8A and 8B are views for further illustrating the example of the method of determining rendering quality according to FIG. 7.

Referring to FIGS. 8A and 8B, the distance from the user 110 to the screen 106 increases from "$D_0$" to "$D_1$".

When the distance from the user 110 to the screen 106 is greater than the reference value, the rendering apparatus 102 may perform rendering according to rendering quality that is lower than the preset rendering quality.

When a distance between an object and the eyes of a person increases, it becomes difficult to distinguish two points located close to each other. When the distance between the eyes of the user 110 and the screen 106 increases, the rendering apparatus 102 according to one example lowers the rendering quality to a degree that the user may not notice the lowering of the rendering quality. Accordingly, while the user does not feel any inconvenience in watching an image, the power consumption of the device 100 may be reduced.

The rendering apparatus 102 according to an example may determine the rendering quality by using the biometric data such as the eyesight of the user 110.

For example, the rendering apparatus 102 may set the critical value used to determine whether to change the rendering quality, based on the eyesight of the user 110. In other words, when the eyesight of the user 110 is good, the rendering apparatus 102 may increase the critical values in Mathematical Formula 5 and Mathematical Formula 7. Accordingly, when the user 110 is located sufficiently far from the screen 106, the rendering apparatus 102 may lower the rendering quality so that the user 110 may not feel uncomfortable.

In another example, the rendering apparatus 102 may determine the new rendering quality based on the eyesight of the user 110. In other words, when the eyesight of the user 110 is bad, the rendering quality may be greatly reduced by decreasing a coefficient to adjust the rendering quality of Mathematical Formula 2 and Mathematical Formula 3.

On the other hand, when the distance between the user 110 and the screen 106 decreases again, as illustrated in FIG. 8A, the rendering apparatus 102 may change the rendering quality back to the preset rendering quality.

Figure 9:
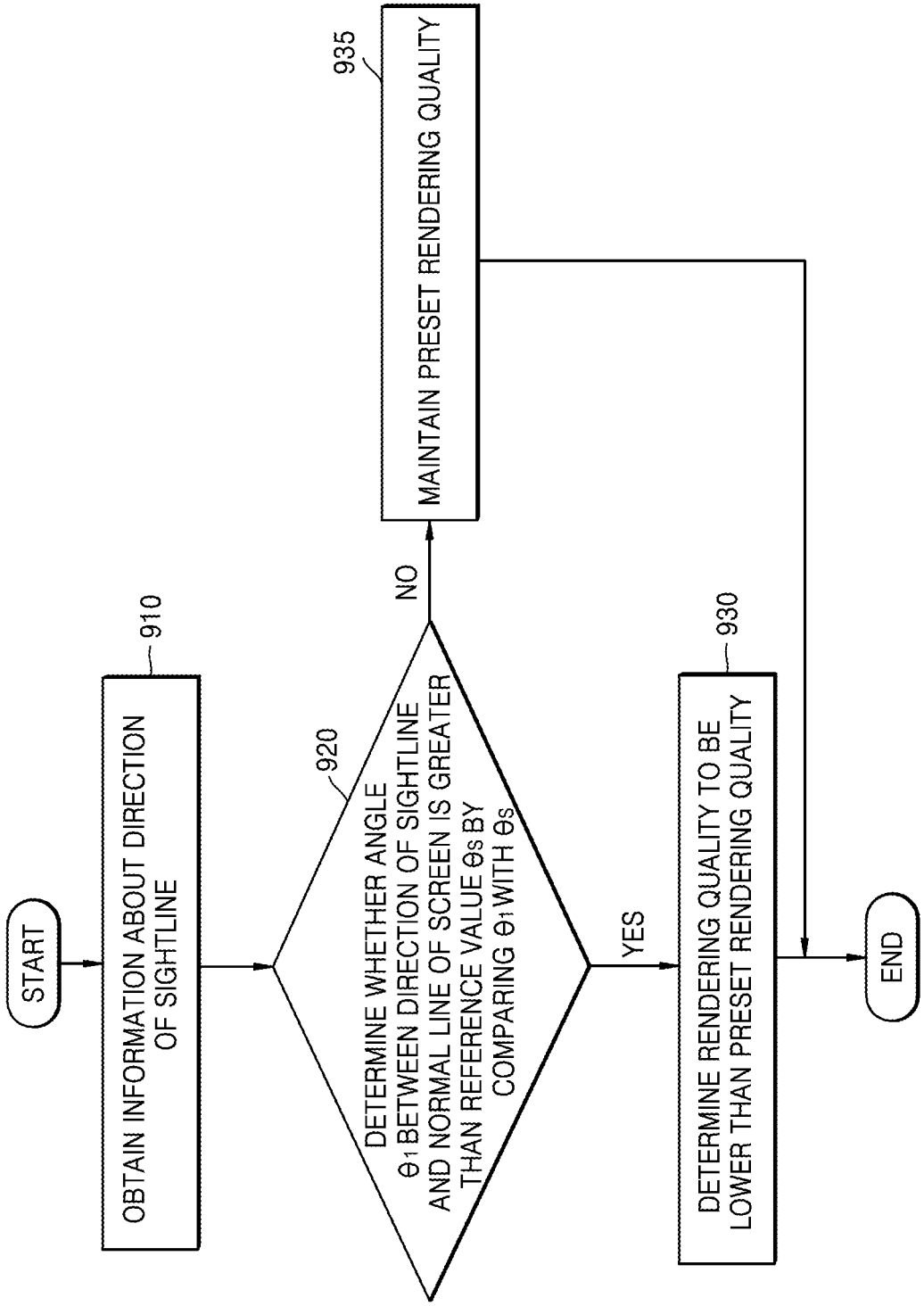
FIG. 9 is a flowchart illustrating another example of a method of determining rendering quality based on an angle between the direction of the sightline of the user and the normal line of a screen.

FIG. 9 is a flowchart for describing an example of a method for determining rendering quality based on an angle between the direction of the sightline 120 of the user 110 and the normal line of the screen 106.

In Operation 910, the rendering apparatus 102 may obtain the information about the direction of the sightline 120 of the user 110.

The rendering apparatus 102 may obtain an angle between the direction of the sightline 120 and the direction of the normal line of the screen 106, by using the information about the direction of the sightline 120.

In Operation 920, the rendering apparatus 102 may determine whether the angle between the direction of the sightline 120 and the direction of the normal line of the screen 106 is greater than the reference value, by comparing the angle between the direction of the sightline and the direction of the normal line of the screen 106 with the reference value.

For example, the reference value may be an angle between the direction of the sightlines 120 obtained just before obtaining the information about the direction of the sightline 120 obtained at the most recent time point and the direction of the normal line of the screen 106.

In this case, when Mathematical Formula 6 is met, the rendering apparatus 102 may determine to change the rendering quality. In other words, the rendering apparatus 102 may determine to change the rendering quality when the angle between the direction of the sightline 120 obtained at the first time point that is the most recent time point and the direction of the normal line of the screen 106 is greater than the angle between the direction of the sightline 120 obtained at the second time point that is just before the first time point and the direction of the normal line of the screen 106, by the preset critical value or higher.

According to another embodiment, the reference value may be the preset critical value.

In this case, when Mathematical Formula 8 is met, the rendering apparatus 102 may determine to change the rendering quality. In other words, the rendering apparatus 102 may determine to change the rendering quality when the angle between the direction of the sightline 120 and the direction of the normal line of the screen 106 is greater than the preset critical value.

When the angle between the direction of the sightline 120 and the direction of the normal line of the screen 106 is determined to be greater than the reference value, Operation 930 is performed. When the angle between the direction of the sightline 120 and the direction of the normal line of the screen 106 is determined to be less than the reference value, Operation 935 is performed.

In Operation 930, the rendering apparatus 102 determines the rendering quality to be lower than the preset rendering quality.

The rendering apparatus 102 according to one example determines the value calculated by Mathematical Formula 2 as a numerical value of the information about the new rendering quality. In Mathematical Formula 2, "c" is a constant that is greater than 0 and less than 1.

The rendering apparatus 102 according to one example determines the value calculated by Mathematical Formula 4 as a numerical value of the information about the new rendering quality. In Mathematical Formula 4, $$"c_2 \times \frac{1}{\theta}"$$

is a number greater than 0 and less than 1.

The rendering apparatus 102 may perform rendering according to the determined new rendering quality.

The rendering apparatus 102 may obtain again the information about the direction of the sightline 120 and may change the rendering quality back to the preset rendering quality when the angle between the direction of the sightline 120 and the direction of the normal line of the screen 106 is determined to be smaller than the reference value. The reset rendering quality signifies rendering quality that is determined by a program modeling operation or set by a user setting when a program is executed.

In Operation 935, the rendering apparatus 102 may maintain the preset rendering quality. In other words, the rendering apparatus 102 may perform rendering according to the preset rendering quality.

As described above, as the angle between the direction of the sightline 120 of the user 110 and the direction of the normal line of the screen 106 increases, that is, as the user 110 obliquely looks at the screen 106, the rendering apparatus 102 may lower the rendering quality and thus the power consumed by a GPU may be reduced.

Figures 10A, 10B:
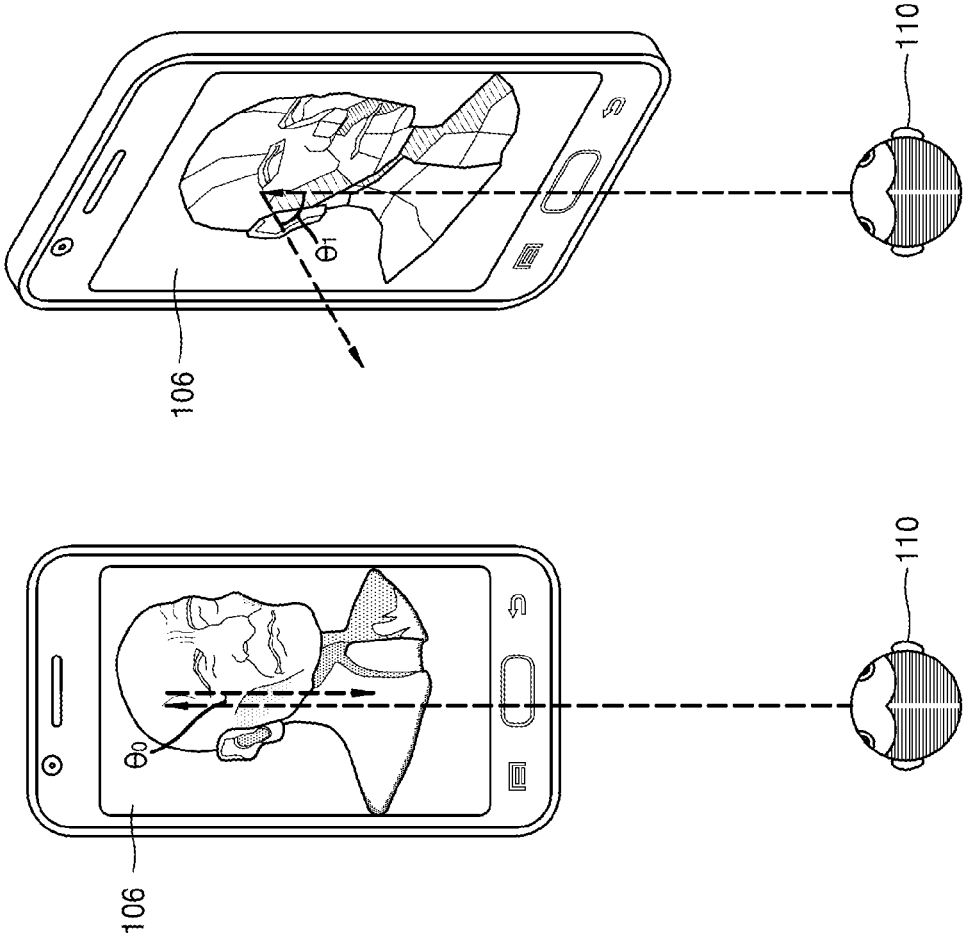
FIGS. 10A and 10B are views for describing the example of the method of determining rendering quality according to FIG. 9.

FIGS. 10A and 10B are views for further illustrating the example of the method of determining rendering quality according to FIG. 9.

Referring to FIGS. 10A and 10B, the angle between the direction of the sightline 120 of the user 110 and the direction of the normal line of the screen 106 is increased from "$\theta_0$" to "$\theta_1$".

When the angle between the direction of the sightline 120 of the user 110 and the direction of the normal line of the screen 106 is greater than the reference value, the rendering apparatus 102 may perform rendering according to rendering quality that is lower than the preset rendering quality. Thus, the consumption of resources may be reduced.

On the other hand, when the angle between the direction of the sightline 120 of the user 110 and the direction of the normal line of the screen 106 decreases again, that is, the user 110 directly looks at the screen 106, the rendering apparatus 102 may change the rendering quality back to the preset rendering quality as illustrated in FIG. 10A.

Figure 11:
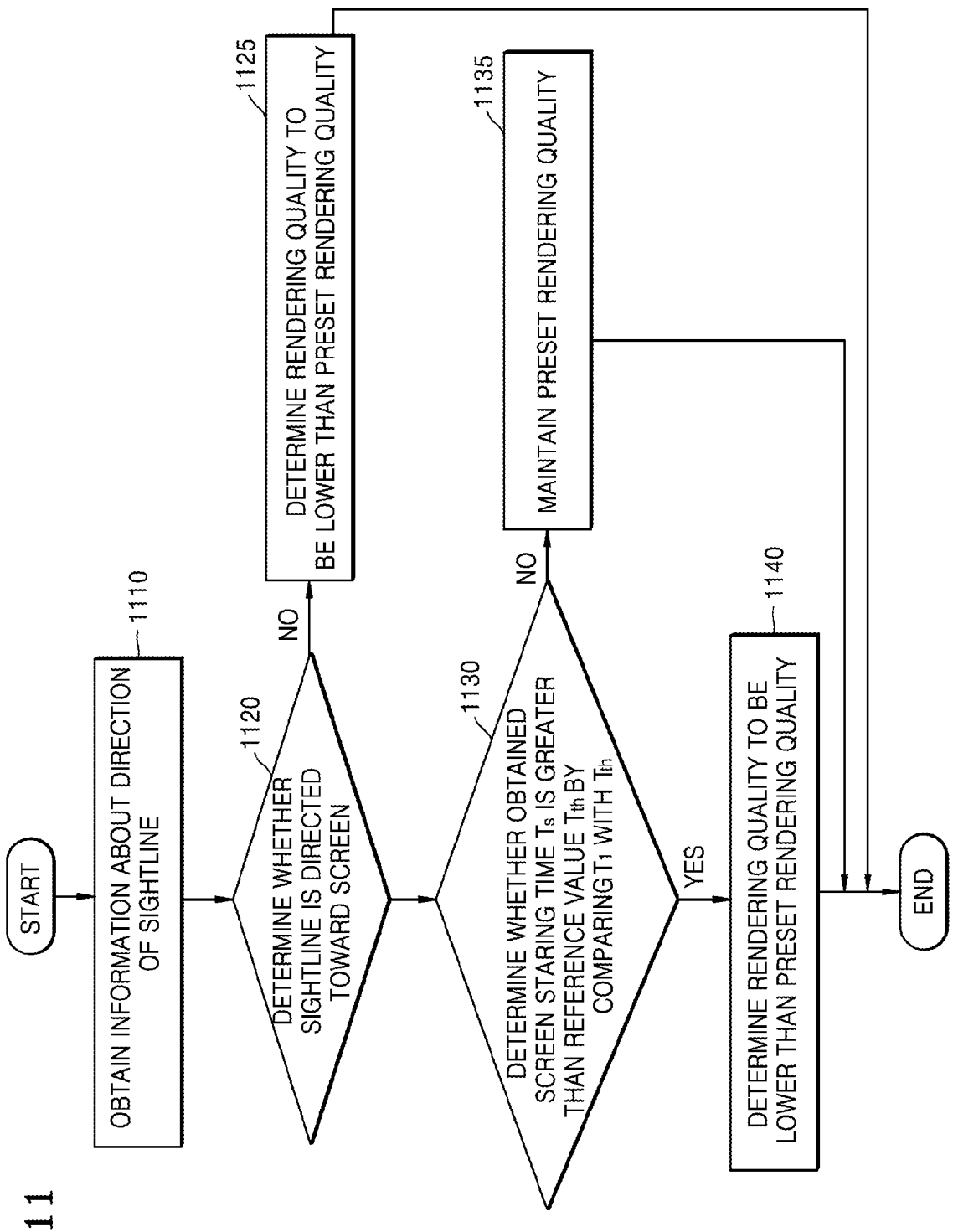
FIG. 11 is a flowchart illustrating another example of a method of determining rendering quality based on a user's screen staring time.

FIG. 11 is a flowchart illustrating an example of a method for determining rendering quality based on a user's screen staring time.

In Operation 1110, the rendering apparatus 102 may obtain the information about the direction of the sightline 120 of the user 110.

The information about the direction of the sightline 120 may include at least one of the position of the sightline 120 to the screen 106, and the movement direction of the sightline 120.

The rendering apparatus 102 according to one example obtains the information about the direction of the sightline 120 at a predetermined time interval. The rendering apparatus 102 may store the obtained information about the direction of the sightline 120 in the storage.

In Operation 1120, the rendering apparatus 102 may determine whether the sightline 120 of the user 110 is directed toward the screen 106.

For example, when the position of the sightline 120 to the screen 106 is within a predetermined range from the screen 106, the rendering apparatus 102 may determine that the sightline 120 of the user 110 is directed toward the screen 106. In other words, the rendering apparatus 102 may determine that the user 110 looks at the screen 106.

In another example, when the movement direction of the sightline 120 to the screen 106 is within a predetermined range, the rendering apparatus 102 may determine that the sightline 120 of the user 110 is directed toward the screen 106. In other words, the rendering apparatus 102 may determine that the user 110 is directed toward the screen 106.

When the rendering apparatus 102 determines that the sightline 120 of the user 110 is directed toward the screen 106, Operation 1130 is performed. When the sightline 120 of the user 110 is not determined to direct the screen 106, Operation 1135 is performed.

In Operation 1135, the rendering apparatus 102 may determine the rendering quality the rendering quality to be lower than the preset rendering quality. Since Operation 1135 of FIG. 11 identically corresponds to Operation 535 of FIG. 5, a redundant description thereof is omitted.

In Operation 1130, when the sightline 120 of the user 110 is determined to direct the screen 106, the rendering apparatus 102 may obtain a screen staring time that is a time during which the sightline 120 of the user 110 is directed toward the screen 106, and may compare the screen staring time with the critical value.

The rendering apparatus 102 according to one example obtains a screen staring time that is a time during which the sightline 120 of the user 110 keeps directed toward the screen 106, by using the information about the sightline 120 of the user 110 that is obtained at a predetermined time interval and stored. For example, the rendering apparatus 102 may obtain the time during which the sightline 120 of the user 110 is determined to direct the screen 106 as the screen staring time.

The rendering apparatus 102 may determine whether to change the rendering quality by comparing the obtained screen staring time with the predetermined critical value.

For example, when Mathematical Formula 9 is met, the rendering apparatus 102 may determine to change the rendering quality.

$$T_1 > T_{th} \quad \text{[Mathematical Formula 9]}$$

In Mathematical Formula 9, "$T_1$" denotes the screen staring time. "$T_{th}$" denotes a critical value, which may be previously set and stored before a program starts.

In an example, the critical value $T_{th}$ may be set based on a user input.

In another example, the critical value $T_{th}$ may be set based on the biometric data such as the eyesight of the user 110, health state, age, etc.

When the rendering apparatus 102 determines that the screen staring time of the user 110 is greater than the critical value, Operation 1140 is performed. When the screen staring time is determined to be smaller than the critical value, Operation 1145 is performed.

In Operation 1140, the rendering apparatus 102 may determine the rendering quality to be lower than the preset rendering quality.

For example, the rendering apparatus 102 may determine the value calculated by Mathematical Formula 2 as a numerical value of the information about the new rendering quality. In Mathematical Formula 2, "c" may be a constant that is greater than 0 and less than 1.

The rendering apparatus 102 obtains again the information about the direction of the sightline 120. When the rendering apparatus 102 determines that the sightline 120 of the user 110 is directed toward the screen 106, the rendering quality may be changed back to the preset rendering quality. The reset rendering quality signifies rendering quality that is determined by a program modeling operation or set by a user setting when a program is executed.

As described above, when the user 110 looks at the screen 106 for a time longer than the critical value, the rendering apparatus 102 may lower the rendering quality. Accordingly, the rendering apparatus 102 may guide the user 110 not to look at the screen 106 too long and simultaneously reduce the power consumed by a GPU.

In Operation 1145, the rendering apparatus 102 may maintain the preset rendering quality. In other words, the rendering apparatus 102 may perform rendering according to the preset rendering quality.

Figure 12:
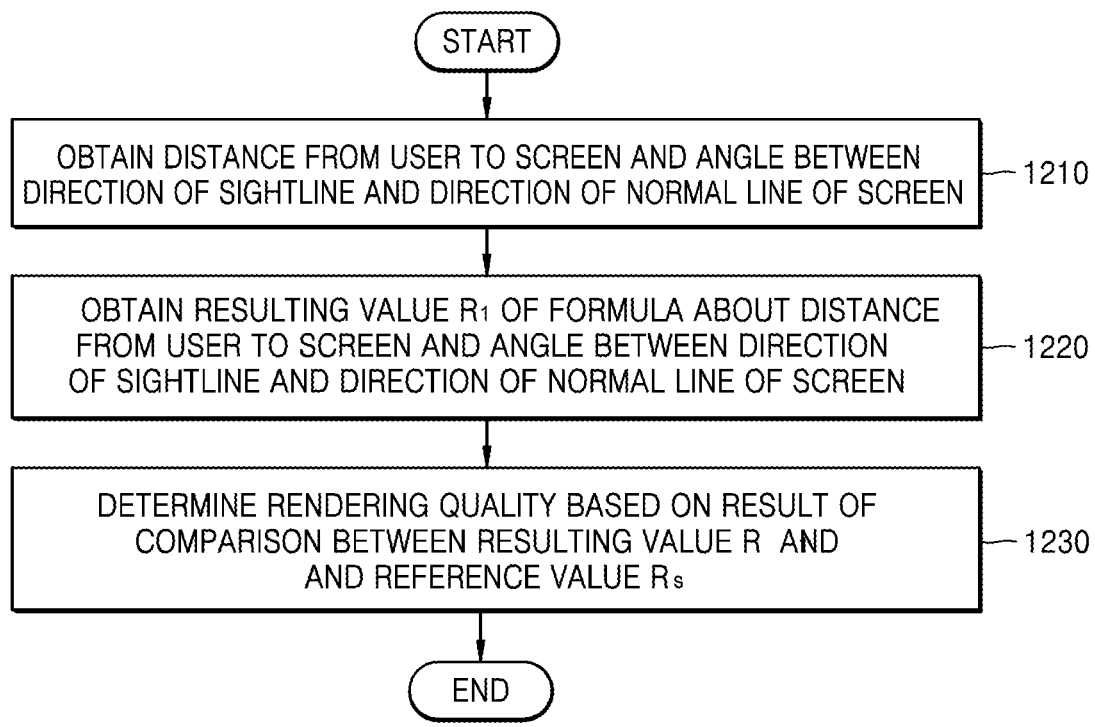
FIG. 12 is a flowchart for describing another example of a method of determining rendering quality based on the direction of the sightline of the user and a distance between a user and a screen.

FIG. 12 is a flowchart illustrating an example of a method for determining rendering quality based on the direction of the sightline 120 of the user 110 and a distance between the user 110 and the screen 106.

In Operation 1210, the rendering apparatus 102 may obtain the distance from the user 110 to the screen 106, and the angle between the direction of the sightline and the direction of the normal line of the screen 106.

According to one example, the rendering apparatus 102 may obtain the distance from the user 110 to the screen 106, and the angle between the direction of the sightline and the direction of the normal line of the screen 106, at a certain time interval.

In Operation 1220, the rendering apparatus 102 may obtain a resulting value of a mathematical formula about the distance from the user 110 to the screen 106 and the angle between the direction of the sightline 120 and the direction of the normal line of the screen 106.

The mathematical formula about the distance from the user 110 to the screen 106 and the angle between the direction of the sightline 120 and the direction of the normal line of the screen 106 is a mathematical formula that is defined to use the calculated resulting value as a factor to determine the rendering quality, by appropriately combining the distance from the user 110 to the screen 106 and the angle between the direction of the sightline and the direction of the normal line of the screen 106.

According to one example, the mathematical formula about the distance from the user 110 to the screen 106 and the angle between the direction of the sightline 120 and the direction of the normal line of the screen 106 may be defined to be Mathematical Formula 1.

$$w_1 \frac{1}{d} + w_2 \frac{1}{\theta} \qquad \text{[Mathematical Formula 1]}$$

In Mathematical Formula 1, "d" denotes the distance from the user 110 to the screen 106 for display an image. "θ" denotes the angle between the direction of the sightline 120 of the user 110 and the direction of the normal line of the screen 106. "$w_1$" is a real number greater than or equal to 0 and denotes a weight to "d". "$w_2$" is a real number greater than or equal to 0 and denotes a weight to "θ".

The resulting value of Mathematical Formula 1 decreases as the distance from the user 110 to the screen 106 for displaying an image increases, and increases as the distance from the user 110 to the screen 106 for displaying an image decreases. Also, the resulting value of Mathematical Formula 1 decreases as the angle between the direction of the sightline 120 of the user 110 and the direction of the normal line of the screen 106 increases, and increases as the angle between the direction of the sightline 120 of the user 110 and the direction of the normal line of the screen 106 decreases. In other words, the resulting value of Mathematical Formula 1 may be proportional to a required rendering quality.

The rendering apparatus 102 may obtain the resulting value of Mathematical Formula 1 by using the obtained information.

The rendering apparatus 102 may store the obtained resulting value in the storage.

In Operation 1230, the rendering apparatus 102 may determine the rendering quality based on a result of the comparison between the obtained resulting value and the reference value.

According to one example, the reference value may be a resulting value obtained at the second time point that is a time point just before the first time point that is the most recent time point.

In this case, when Mathematical Formula 10 is met, the rendering apparatus 102 may determine to change the rendering quality.

$$R_1 < R_0 - R_{th} \qquad \text{[Mathematical Formula 10]}$$

In Mathematical Formula 10, "$R_0$" denotes the resulting value obtained at the second time point. "$R_1$" denotes the result value obtained at the first time point. "$R_{th}$" denotes a critical value, which may be previously set and stored before a program starts.

In other words, the rendering apparatus 102 may determine to change the rendering quality when the resulting value obtained at the first time point is less than the result value obtained at the second time point by the preset critical value or higher.

For an example, the critical value "$R_{th}$" may be set based on a user input.

In another example, the critical value "$R_{th}$" may be set based on the biometric data such as the eyesight of the user 110.

According to yet another example, the reference value may be the preset critical value.

In this case, when Mathematical Formula 11 is met, the rendering apparatus 102 may determine to change the rendering quality.

$$R_1 < R_{th} \qquad \text{[Mathematical Formula 11]}$$

In Mathematical Formula 11, "$R_1$" denotes the result value obtained at the most recent time point. "$R_{th}$" denotes the critical value, which may be previously set and stored before a program starts.

In other words, when the obtained value is less than the preset critical value, the rendering apparatus 102 may determine to change the rendering quality.

In an example, the critical value "$R_{th}$" may be set based on a user input.

In another example, the critical value "$R_{th}$" may be set based on the biometric data such as the eyesight of the user 110.

When the rendering quality is determined to be changed, the rendering apparatus 102 may determine the new rendering quality.

For example, the rendering apparatus 102 may determine the value calculated by Mathematical Formula 2 as a numerical value of the information about the new rendering quality.

In another example, the rendering apparatus 102 may determine the value calculated by Mathematical Formula 12 as a numerical value of the information about the new rendering quality.

$$Q_{new} = R_1 \times Q_{curr} \qquad \text{[Mathematical Formula 12]}$$

In Mathematical Formula 12, when the information about rendering quality is the number of mipmap levels, "$Q_{curr}$" denotes the number of mipmap levels according to the preset rendering quality. "$Q_{new}$" denotes the number of mipmap levels according to the new rendering quality. "$R_1$" denotes the currently obtained resulting value. When "$Q_{new}$" is not a natural number, the number of mipmap levels according to the new rendering quality may be determined to be a natural number that is the most approximate to "$Q_{new}$".

According to another example, the reference value may be a plurality of preset critical values.

For example, when the critical values "$R_{th1}$" and "$R_{th2}$" exist as the reference value, the rendering apparatus 102 may determine the numerical value of the information about rendering quality by Mathematical Formula 13.

$$Q_{new} = \begin{cases} Q_{curr}, & R_1 > R_{th1} \\ c_1 \times Q_{curr}, & R_{th1} > R_1 > R_{th2} \\ c_2 \times Q_{curr}, & R_{th2} > R_1 \end{cases} \qquad \text{[Mathematical Formula 13]}$$

In Mathematical Formula 13, when the information about rendering quality is the number of mipmap levels, "$Q_{curr}$" denotes the number of mipmap levels according to the preset rendering quality. "$Q_{new}$" denotes the number of mipmap levels according to the new rendering quality. "$R_1$" denotes the currently obtained resulting value. "$R_{th1} > R_{th2}$" and "$1 > c_1 > c_2 > 0$" are satisfied. When "$Q_{new}$" is not a natural number, the number of mipmap levels according to the new rendering quality may be determined to be a natural number that is the most approximate to "$Q_{new}$".

In other words, the rendering apparatus 102 may perform rendering according to the rendering quality corresponding to a section to which the obtained resulting value belongs, among the rendering qualities allotted corresponding to the respective sections divided by at least two critical values.

FIG. 13 illustrates a lookup table that may be used for controlling rendering quality in an example of a rendering method.

In this example, the rendering apparatus 102 may store in the storage a numerical value of the information about rendering quality corresponding to the rendering quality, and an application thereof, in the form of a look-up table.

In response to a determination that the rendering quality is changed, the rendering apparatus 102 may perform rendering by applying a setting of the information about each rendering quality corresponding to the new rendering quality.

Referring to FIG. 13, according to the preset rendering quality, anti-aliasing is applied, a sampling rate is 16, the number of mipmap levels is 7, resolution is 2880×1800, and a tessellation level is Level 5. In this example, when the rendering apparatus 102 determines to change the rendering quality, the rendering apparatus 102 performs rendering by changing the rendering quality according to the new rendering quality in which anti-aliasing is not applied, a sampling rate is 4, the number of mipmap levels is 3, resolution is 1920×1080, and a tessellation level is Level 1.

The rendering apparatus 102 may divide the rendering quality into at least three or more levels and store in the storage a numerical value of the information about rendering quality corresponding to each rendering quality, and an application thereof, in the form of a look-up table. The rendering apparatus 102 may determine the new rendering quality of the levels according to a state of the user 110 watching an image. The rendering apparatus 102 may perform rendering by applying a setting of each of pieces of the information about rendering quality corresponding to the determined new rendering quality.

Figure 14:
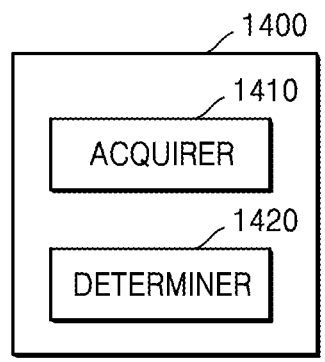
FIG. 14 is a block diagram of an example of an apparatus for controlling rendering quality.

FIG. 14 is a block diagram of an example of an apparatus 1400 for controlling rendering quality.

Referring to FIG. 14, the rendering quality control apparatus 1400 includes an acquirer 1410 and a determiner 1420. The rendering quality control apparatus 1400 may be embodied so as to include additional constituent elements not illustrated in FIG. 14. The acquirer 1410 and the determiner 1420 may be implemented with one or more computer processors.

The constituent elements are described below in sequence.

The acquirer 1410 acquires the information about the sightline 120 of the user 110.

The information about the sightline 120 may include at least one of the position of the sightline 120 with respect to the screen 106, the movement direction of the sightline 120 to the screen 106, and the distance from the user 110 to the screen 106. According to one example, the acquirer 1410 acquires the information about the sightline 120 of the user 110 that is detected by the image sensing camera 104 and converted to an electric signal in a signal processor (not shown). The information about the sightline 120 may include the information about the direction of the sightline and the distance from the user 110 to the screen 106. Also, the information about the direction of the sightline may include the position of the sightline 120 to the screen 106 and the movement direction of the sightline 120 to the screen 106.

Also, the acquirer 1410 may acquire the information about the sightline 120 of the user 110 at a certain time interval.

The determiner 1420 determines the rendering quality based on at least one piece of the obtained information.

According to one example, the determiner 1420 determines whether to change the rendering quality based on at least one piece of the obtained information. The determiner 1420 may determine the new rendering quality when the rendering quality is determined to be changed. Also, the determiner 1420 may determine a numerical value of the information about rendering quality according to the new rendering quality, and an application thereof.

When the user 110 does not look at the screen 106, the distance from the user 110 to the screen 106 is relatively long, and the angle between the direction of the sightline 120 of the user 110 and the normal line 108 of the screen 106 is relatively large, the determiner 1420 may lower the rendering quality to be less than the preset rendering quality.

According to various examples described in the present specification, the rendering quality control apparatus 1400 may reduce the amount of work to be done by a GPU by changing the preset rendering quality in real time as necessary. Accordingly, the rendering quality control apparatus 1400 may reduce consumption of power by the device 100.

The rendering quality control apparatus 1400 according to one example may lower the rendering quality when the user 110 does not look at the screen 106. The rendering quality control apparatus 1400 according to another example may lower the rendering quality to a degree that the user 110 does not notice the change of the rendering quality, according to a state in which the user 110 looks at the screen 106.

Accordingly, the rendering quality control apparatus 1400 according to the present disclosure may extend a battery use time of the device 100. Also, the rendering quality control apparatus 1400 according to the present disclosure may prevent overheat of the device 100, thereby improving stability of the device 100. Also, the rendering quality control apparatus 1400 according to the present disclosure may reduce unnecessary consumption of resources of the device 100, thereby extending the life of the device 100.

Figure 15:
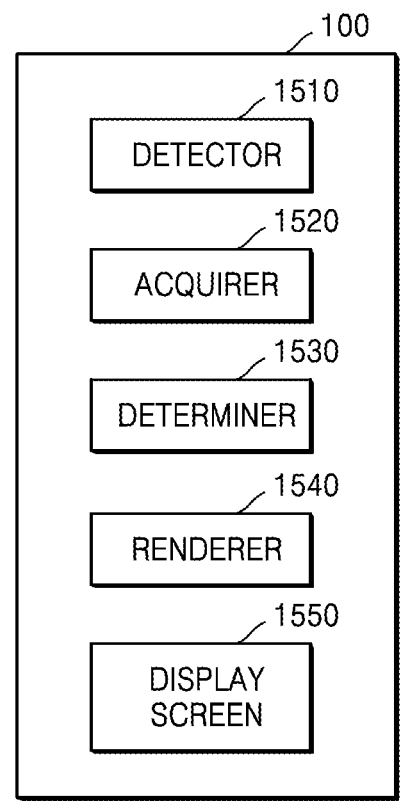
FIG. 15 is a block diagram of an example of a device.

FIG. 15 is a block diagram of an example of a rendering device that renders an image.

Referring to FIG. 15, the device 100 includes a detector 1510, an acquirer 1520, a determiner 1530, a renderer 1540, and a display screen 1550. However, all the illustrated constituent elements are not essential constituent elements. In addition, the device 100 may be embodied to include additional constituent elements not illustrated in FIG. 15. According to one example, the detector 1510 includes one or more image sensing camera 104, and the acquirer 1520, the determiner 1530 and the renderer image sensing camera 104 are implemented with one or more computer processors. The display screen 1550 may be configured to display an image, and may be positioned adjacent to an image sensing camera 104; however, the present disclosure is not limited thereto. Examples of a display screen 1550 include a touch screen, an LED screen, an LCD screen or an OLED screen; however, the present disclosure is not limited thereto.

Since the acquirer 1520 and the determiner 1530 illustrated in FIG. 15 identically correspond to the acquirer 1410 and the determiner 1420 illustrated in FIG. 14, redundant descriptions thereof in FIG. 14 are omitted.

In this example, the detector 1510 may photograph the user 110, recognize an eye area of the user 110, and detect the sightline 120 of the user 110. The detector 1510 may include, for example, the image sensing camera 104.

Also, the detector 1510 may obtain data about the movement of the eyeball of the user 110 by using an eye-tracker including an infrared LED and a camera, but the present disclosure is not limited thereto. For example, the detector 1510 may be included in or attached to the device 100. In another example, the detector 1510 may be included in or attached to glasses that the user 110 wears, but the present disclosure is not limited thereto.

An example of a method in which the detector 1510 detects the eyeball of the user 110 is described below. When an infrared LED installed close to the camera is turned on, the eye-tracker may obtain an image of the eyes that are bright. When an infrared LED that is located far from the camera is turned on, the eye-tracker may obtain an image of the eyes that are not bright. The eye-tracker converts the images into black and white images to extract eyeball portions of the eyes that are bright, from the obtained two images, thereby detecting the eyeballs.

The renderer 1540 according to one example performs the rendering of the graphic image displayed on the display screen 1550 according to the determined rendering quality.

The renderer 1540 may render the image by applying the determined rendering quality to each operation of the rendering pipeline that may set the rendering quality.

The apparatus described herein may comprise a processor, a memory for storing program data to be executed by the processor, a permanent storage such as a disk drive, a communications port for handling communications with external devices, and user interface devices, including a display, keys, and the like. The display may include the display screen 1550. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the present disclosure, reference has been made to various embodiments illustrated in the drawings, and specific language has been used to describe these embodiments. However, no limitation of the scope of the present disclosure is intended by this specific language, and the present disclosure should be construed to encompass all embodiments that would normally occur to one of ordinary skill in the art.

The examples may be described in terms of functional block components and various processing steps. Such functional blocks may be realized by any number of hardware and/or software components configured to perform the specified functions. For example, the examples may employ various integrated circuit components, e.g., memory elements, processing elements, logic elements, look-up tables, and the like, which may carry out a variety of functions under the control of one or more microprocessors or other control devices. Similarly, where the elements of the examples are implemented using software programming or software elements, the example may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the example may employ any number of conventional techniques for electronics configuration, signal processing and/or control, data processing and the like. The words "mechanism" and "element" are used broadly and are not limited to mechanical or physical embodiments, but may include software routines in conjunction with processors, and the like.

The implementations illustrated and described herein are illustrative examples of the present disclosure and are not intended to otherwise limit the scope of the claims in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the examples unless the element is specifically described as "essential" or "critical". It will be recognized that terms "comprising," "including," and "having," as used herein, are specifically intended to be read as open-ended terms of art.

The use of terms "a" and "an" and "the" and similar referents in the context of describing the example (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the examples and does not pose a limitation on the scope of the present disclosure unless otherwise claimed. Numerous modifications and adaptations will be readily apparent to those of ordinary skill in this art without departing from the spirit and scope of the present disclosure.

As described above, the method of controlling the rendering quality according to one or more of the above embodiments, when high rendering quality is not needed according to a state in which a user looks at a screen, the rendering quality may be lowered. Accordingly, unnecessary use of resources may be reduced and power consumption of a GPU may be reduced.

The units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. The software and data may be stored by one or more non-transitory computer readable recording mediums.

It should be understood that the embodiments described herein should be considered in a descriptive sense only and not for purposes of limitation. Descriptions of features or aspects within each embodiment should typically be considered as available for other similar features or aspects in other embodiments.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rendering method for reducing complexity comprising:
    obtaining information about a sightline of a user;
    determining rendering quality based on the obtained information; and
    rendering a graphic image according to the determined rendering quality,
    wherein the rendering quality denotes a level-of-detail of the graphic image displayed on a screen,
    wherein the graphic image is newly rendered for reducing complexity when the determined rendering quality is lower than previous rendering quality,
    wherein the obtaining of the information about the sightline of the user comprises obtaining a distance from the user to the screen that displays the graphic image and an angle between a direction of the sightline of the user and a direction of a normal line of the screen, and
    wherein the rendering quality is determined based on a reciprocal of the obtained distance and a reciprocal of the obtained angle.

2. The rendering method of claim 1, wherein the information about the sightline comprises any one or any combination of a position of the sightline to a screen that displays the graphic image, a movement direction of the sightline to the screen, and a distance from the user to the screen.

3. The rendering method of claim 1, wherein the obtaining of the information about the sightline of the user comprises obtaining the information about the sightline of the user at time intervals.

4. The rendering method of claim 3, wherein the determining of the rendering quality comprises:
    using a processor to compare information obtained at a first time point with information obtained at a second time point; and
    changing rendering quality of the graphic image based on a result of the comparing.

5. The rendering method of claim 4, wherein the information about the sightline of the user comprises a distance from eyes of the user to a screen that displays the graphic image,
- the comparing of the information obtained at the first time point with the information obtained at the second time point comprises comparing a distance from the eyes of the user to the screen obtained at the second time point with a reference value, and
- the reference value comprises either one or both of the distance from the eyes of the user to the screen obtained at the first time point and a critical value.

6. The rendering method of claim 4, wherein the obtaining of the information about the sightline of the user further comprises obtaining an angle between a direction of the sightline and a direction of a normal line of a screen that displays the graphic image, by using the obtained information, and
- the comparing of the information obtained at the first time point with the information obtained at the second time point comprises comparing the angle between the direction of the sightline of the user obtained at the second time point and the direction of the normal line of the screen, with a reference value, and
- the reference value comprises either one or both of the direction of the sightline of the user obtained at the first time point and the direction of the normal line of the screen, and a critical value.

7. The rendering method of claim 1, wherein the information about the sightline of the user comprises either one or both of a position of the sightline to a screen that displays the graphic image and a movement direction of the sightline of the user, and
- the determining of the rendering quality comprises:
- determining whether the sightline of the user is directed toward the screen, based on the information about the sightline of the user; and
- in response to a determination that the sightline of the user is not directed toward the screen, determining the rendering quality to be lower than a preset rendering quality.

8. The rendering method of claim 7, further comprising:
- in response to a determination that the sightline of the user is directed toward the screen, obtaining a screen staring time that is a time during which the sightline of the user remains directed toward the screen;
- comparing the screen staring time with a critical value; and
- changing the rendering quality based on a result of the comparing.

9. The rendering method of claim 1, wherein the information about rendering quality comprises any one or any combination of any two or more of a number of vertexes per object, an anti-aliasing level, a sampling rate, a mipmap level, a resolution, and a tessellation level.

10. The rendering method of claim 1, wherein
- the determining of the rendering quality comprises determining the rendering quality based on a resulting value of Mathematical Formula 1 using the obtained distance and angle, $$w_1 \frac{1}{d} + w_2 \frac{1}{\theta},$$ [Mathematical Formula 1]

wherein, in Mathematical Formula 1, "d" denotes the distance from the user to the screen for displaying an image, "θ" denotes the angle between the direction of the sightline of the user and the direction of the normal line of the screen, "$w_1$" is a real number greater than or equal to 0 and denotes a weight to "d", and "$w_2$" is a real number greater than or equal to 0 and denotes a weight to "θ".

11. The rendering method of claim 10, wherein the rendering of the graphic image comprises rendering the graphic image displayed on the screen according to the rendering quality corresponding to a section to which the resulting value belongs, among rendering qualities allotted corresponding to respective sections divided by at least two critical values.

12. The rendering method of claim 1, wherein the determining of the rendering quality comprises determining the rendering quality by using the information about the sightline and biometric data of the user that is previously stored.

13. An apparatus for controlling rendering quality to reduce complexity, the apparatus comprising:
- a processor configured to
- acquire information about a sightline of a user,
- determine the rendering quality based on the acquired information, and
- render a graphic image according to the determined rendering quality,
- wherein the rendering quality denotes a level-of-detail of a graphic image that is displayed on a screen
- wherein the processor is further configured to newly render the graphic image for reducing complexity when the determined rendering quality is lower than previous rendering quality,
- wherein the processor is further configured to acquire a distance from the user to the screen that displays the graphic image and configured to acquire an angle between a direction of the sightline of the user and a direction of a normal line of the screen, and
- wherein the rendering quality is determined based on a reciprocal of the acquired distance and a reciprocal of the acquired angle.

14. The apparatus of claim 13, wherein the processor is configured to acquire the information about the sightline of the user at time intervals, and the processor is configured to compare information obtained at a first time point and information obtained at a second time point and changes the rendering quality of the graphic image based on a result of the comparing.

15. The apparatus of claim 13, wherein the information about the sightline of the user comprises the distance from eyes of the user to the screen that displays a graphic image, and
- the processor is configured to compare the distance from the eyes of the user to the screen obtained at the second time point with a reference value, and to change the rendering quality of the graphic image based on a result of the comparing, and
- the reference value comprises either one or both of the distance from the eyes of the user to the screen obtained at the first time point and a critical value.

16. The apparatus of claim 14, wherein the processor is configured to acquire the angle between a direction of the sightline and a direction of a normal line of a screen that displays a graphic image, by using the acquired information, and
- the processor is configured to compare the angle between the direction of the sightline of the user obtained at the second time point and the direction of the normal line of the screen, with a reference value, and to determine a preset rendering quality of the graphic image based on a result of the comparing, and the reference value comprises either one or both of the direction of the sightline of the user obtained at the first time point and the direction of the normal line of the screen, and a critical value.

17. The apparatus of claim 13, wherein the information about the sightline of the user comprises either one or both of a position of a sightline to a screen that displays a graphic image and a movement direction of the sightline of the user, and the processor is configured to determine whether the sightline of the user is directed toward the screen, based on the information about the sightline of the user and, in response to a determination that the sightline of the user is not directed toward the screen, to determine the rendering quality to be lower than a preset rendering quality.

18. A device for reducing complexity comprising:

a screen configured to display an image to a user;

a detector configured to detect a sightline of the user with respect to the screen; and a processor configured to adjust rendering quality of the image based on the sightline of the user with respect to the screen, wherein the rendering quality denotes a level-of-detail of a graphic image that is displayed on a screen, wherein the processor is further configured to newly adjust rendering quality of the image for reducing complexity when the sightline of the user is not detected by the detector, wherein the processor is further configured to determine a distance from the user to the screen that displays the graphic image and configured to determine an angle between a direction of the sightline of the user and a direction of a normal line of the screen, and wherein the rendering quality is determined based on a reciprocal of the determined distance and a reciprocal of the determined angle.

* * * * *